US007256789B1

(12) United States Patent
Nakamura et al.

(10) Patent No.: US 7,256,789 B1
(45) Date of Patent: Aug. 14, 2007

(54) PROGRAMMABLE DISPLAY DEVICE

(75) Inventors: Satoshi Nakamura, Sakura (JP); Hiroyuki Yamamura, Chiba (JP); Shinzi Yamamoto, Chiba (JP); Masaaki Moriya, Chiba (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/341,633

(22) PCT Filed: Jan. 22, 1998

(86) PCT No.: PCT/JP98/00233

§ 371 (c)(1),
(2), (4) Date: Jul. 15, 1999

(87) PCT Pub. No.: WO98/33167

PCT Pub. Date: Jul. 30, 1998

(30) Foreign Application Priority Data

Jan. 23, 1997 (JP) .................................. 9-010592

(51) Int. Cl.
*G06T 1/60* (2006.01)

(52) U.S. Cl. ...................... 345/530; 345/560; 345/600; 345/532; 345/538; 345/601; 345/603; 345/604; 345/605

(58) Field of Classification Search ................ 345/560, 345/601, 603, 604, 667, 670, 538, 548, 547, 345/669, 443, 554, 544, 566, 2.2, 92, 556, 345/503, 533, 543, 542, 501, 98, 530, 532, 345/600, 605; 710/22, 68; 711/170
See application file for complete search history.

(56) References Cited

U.S. PATENT DOCUMENTS 4,679,038 A 7/1987 Bantz et al.
5,043,714 A * 8/1991 Perlman ..................... 345/560
5,526,025 A * 6/1996 Selwan et al.
5,706,478 A * 1/1998 Dye ........................... 345/503
5,771,031 A * 6/1998 Kinoshita et al. ............. 345/98
5,808,629 A * 9/1998 Nally et al.
5,901,274 A * 5/1999 Oh ............................ 358/1.2
5,909,205 A * 6/1999 Furuhashi et al.
6,124,842 A * 9/2000 Mizutome et al. .......... 345/698
6,252,563 B1 * 6/2001 Tada et al.

FOREIGN PATENT DOCUMENTS

EP 0 342 022 11/1989
EP 0 479 508 4/1992
GB 1 503 362 3/1978

(Continued)

*Primary Examiner*—Kimbinh T. Nguyen
(74) *Attorney, Agent, or Firm*—Birch, Stewart, Kolasch & Birch, LLP

(57) ABSTRACT

It comprises a main CPU, a main memory for storing the programs, display data and other data, a data processing circuit for performing a processing to convert the display data in the main memory to the data format for the display, a display memory section for storing the converted display data, an output processing circuit for performing a processing to output the display data on the screen, a DMA for performing a data access to the main memory, a program memory, a data memory, a display processor for interpreting the commands/data described in the program memory and the data memory and transferring the display data according thereto, and a sync signal generating circuit.

9 Claims, 21 Drawing Sheets

FOREIGN PATENT DOCUMENTS

| | | | |
|---|---|---|---|
| GB | 2 287 627 | | 9/1995 |
| JP | 54-25630 | A | 2/1979 |
| JP | 57-17073 | A | 1/1982 |
| JP | 57-169790 | A | 10/1982 |
| JP | 59-119387 | A | 7/1984 |
| JP | 59128590 | | 7/1984 |
| JP | 60-257491 | A | 12/1985 |
| JP | 63-159961 | A | 7/1988 |
| JP | 63-223691 | A | 9/1988 |
| JP | HEI-1274232 | | 11/1989 |
| JP | HEI-619452 | | 1/1994 |
| JP | HEI-6149527 | | 5/1994 |
| JP | HEI-6266834 | | 9/1994 |
| JP | HEI-6295169 | | 10/1994 |
| JP | HEI-736430 | | 2/1995 |
| JP | HEI-7334342 | | 12/1995 |
| JP | HEI-7336727 | | 12/1995 |
| JP | 09-006318 | | 1/1997 |
| WO | 83/01696 | | 5/1983 |

* cited by examiner

| Control data | State of motionr | Motion of each counter after processing | | Write motion |
|---|---|---|---|---|
| | | Readout counter | Write counter | |
| 0 0 | normal | + 1 | + 1 | to be done |
| 0 1 | contraction | + 1 | + 0 | not to be done |
| 1 0 | expansion | + 0 | + 1 | to be done |
| 1 1 | skip | + 0 | + 1 | not to be done |

PROGRAMMABLE DISPLAY DEVICE

This application is the national phase under 35 U.S.C. § 371 of PCT International Application No. PCT/JP98/00233 which has an International filing date of Jan. 22, 1998 which designated the United States of America.

TECHNICAL FIELD

The present invention relates to a programmable display device in a computer system which displays image data, in particular, to a system which reads data for the display from a memory in a graphic display system very flexibly, and can define dynamically the minimum unit of the pixel data to be read out for every pixel, when reading the data for the display from the memory.

BACKGROUND OF ART

Conventionally, in a standard computer, the superposing and synthesizing processing of the display data in a single frame memory is performed directly by a main processor or portrayal device on the memory. FIG. 1 is a block diagram showing one embodiment of the conventional image display device. This image display device is composed of a main CPU 101, a main memory 102, a data processing circuit 103, a line memory 104, an output processing circuit 105, a system controller 106, and a sync signal generating circuit 107.

In the main memory 102, some display data are stored. For example, considering a case where several kinds of window display are performed, display data corresponding to each window is stored. When these windows are superposed and displayed on one screen, the main CPU 101 selects and reads each display data so as to obtain one screen-display, and stores again the display data for one screen in the main memory 102. The system controller 106 generates an address of the main memory 102 for the data transfer, according to the timing of the sync signal generated by the sync signal generating circuit 107. After the display data is read out from the main memory 102 according to this address, and a predetermined data processing is performed by the data processing circuit 103, the data is transferred to the line memory 104. The data from the line memory 104 is output according to the timing of the sync signal, subjected to the processing for display by means of the output processing circuit 105 and displayed on the display.

Furthermore, as disclosed in Japanese Patent Application Laid-Open Hei 6 No. 149527, there is a system in which frame memories are prepared for the numbers necessary for superposition, the data is read out from all the frame memories at the time of outputting the picture, and the synthesized results are displayed based on the priority among respective frames.

Moreover, as disclosed in Japanese Patent Application Laid-Open Hei 6 No. 295169, there is a system which identifies which mode (for example, the bit number of one pixel) each display dot is in by providing an identification memory for every display dot of the memory in the display area separately from the memory for display, and displays the display dot according to the mode, and displays a different display mode on one screen.

In addition, there is a system which references the content of the identification memory, or a system which utilizes a separate mask memory and when the information in each window now being displayed is changed and rewritten, masks the outside of the area, as disclosed in Japanese Patent Application Laid-Open Hei 7 No. 334342.

When the main CPU 101 performs the processing such as superposition and the like of each window, however, the burden of the main CPU 101 becomes too much, resulting in such a problem that the main CPU 101 cannot perform other processing to decrease the overall processing speed.

Furthermore, in a method to reduce the processing load of the software by having frame memories for the numbers required to superpose each window, it is required from the initial stage to have the frame memories of the maximum numbers to be considered necessary. Namely, regardless of the size of the window to be displayed on the screen, the frame memories are required in the maximum size of the display area. Therefore, the efficiency of using the memory is decreased, and when a number of windows are open at the same time, it is required to read out the data simultaneously from the whole frame memories corresponding to the window. Namely, it is necessary to read out the data whose window is superposed and not displayed actually. Thus, the consumed power becomes large proportional to the number of windows opened on the screen.

Furthermore, as a method to mingle and display different display modes on one screen as in the conventional device, there can be mentioned a method to identify which mode each display dot is in by providing identification memories for each display dot of the memory in the display area. In this method, since the identification memory of several bits becomes necessary separately for the memory for the full screen, a memory (identification memory) becomes necessary on the side which cannot be used for other applications. Similar thing can be said when the mask memory is used.

It is an object of the present invention to provide a programmable display device which requires only a memory space for storing the display data, and which can increase the processing speed by reducing the number of access to the memory for the display and reduce the burden of the main control section.

DISCLOSURE OF THE INVENTION

The present invention has been developed in order to attain the above object, and the aspect thereof is as follows.

The first aspect is a programmable display device comprising:

a main memory which stores the display data;

a data processing circuit which converts the data format of said display data into the data format of the screen display;

a number of line memories which store the display data converted by said data processing circuit per unit of the display line;

a display control section which controls the transfer and storage of the display data from said main memory to/in said line memory and the readout of the necessary display data from said line memory to display it on the screen; and a main control section which controls the storage of said display data in said main memory, and the transfer of the stored information including the data format and the storage address to said display control section, wherein said display control section reading out said display data by specifying the address of the display data for one line which has a possibility to be displayed on the screen to said main memory from which the display data is transferred, based on said stored information, causing said data processing circuit to perform the data transfer and select said line memory to store said display data.

The second aspect of the present invention is a programmable display device according to claim 1, wherein said display control section controls the storage of the display data to be utilized repeatedly in said line memory, so that when the repeated display data is displayed, said repeated display data is read out from said line memory by specifying the address thereof and displayed on the screen.

The third aspect of the present invention is a programmable display device according to claim 1, further comprising a data buffer memory for storing the display data to be utilized repeatedly, and when said data is displayed on the screen, said display control section causes said repeated display data to be read out from said data buffer memory and displayed on the screen.

The fourth aspect of the present invention is a programmable display device according to claim 1, which includes:

a first buffer memory for storing the display data read out from said main memory;

a second buffer memory for storing the display data read out from said first buffer memory; and an address counter for counting the readout address and the write address of said first and the second buffer memories; wherein said display control section controlling the stop and motion of the readout address count and the write address count, respectively, with respect to said address counter, performing the processing of expansion, contraction and skip and storing the data in said line memory.

The fifth aspect of the present invention is a programmable display device according to claim 4, wherein said display control section causes the stop and motion of the readout address count to be repeated in a predetermined order.

The sixth aspect of the present invention is a programmable display device according to claim 1, wherein said data processing circuit has a plurality of conversion processing circuits for converting various data formats, and said display control section selects said conversion processing circuits based on the data format information of said stored information.

The seventh aspect of the present invention is a programmable display device according to claim 1, wherein said display control section is provided with a program memory and a data memory for storing the necessary programs and data.

The eighth aspect of the present invention is a programmable display device according to claim 7, wherein said display control section causes the information necessary for said program memory and said data memory to be transferred from said main memory.

The ninth aspect of the present invention is a programmable display device according to claim 1, wherein said display control section adds the line information showing in which line the data is to be used when storing the display data in said line memory, and controls the display of the data in such a manner that when reading out the display data from said line memory, the line information is read out simultaneously and the data is displayed only when the line which uses said display data is the same with the line information.

In the invention of said aspect 1, the display data of the portion required at the time of display is taken out from the main memory and used. Therefore, it is possible to take out the data at an optional position in the main memory and combine them optionally. This control is performed by the display control section, thus the main control section need not perform the processing, hence the processing load of the main control section in the software can be reduced.

In the invention of said aspect 2, when the data is to be repeated in the line direction, as the background in the window system, the readout line memory address can be looped in an optional position.

In the invention of said aspect 3, since the cursor and the repeated background can be stored in the data buffer memory, it is not necessary to read out the routine data from the main memory. Thus, the number of use of the data bus can be reduced.

In the invention of said aspect 4, it is not necessary to perform the expansion/contraction processing with respect to the data for the display in advance, in order to perform the expansion/contraction processing when the display data is read out, hence the efficiency of using the bus can be increased. In addition, when the video input picture is displayed, it is normal that the change of the picture size is required, but by performing the expansion/contraction processing at the output stage, the expansion/contraction circuit can be utilized more effectively. Thereby, while taking in the video data always in a full size, the display can be set in an optional size without the need of transferring the data to the frame memory or the like.

In the invention of said aspect 5, expansion and contraction at a certain magnification can be performed with a simple processing, by repeating the stop/motion of the readout address count from the first buffer memory in a predetermined order.

In the invention of said aspect 6, since the display control section can perform the data conversion based on the data format information in the stored information, the format to store the data for the display is not particularly limited.

In the invention of said aspect 7, since there are provided a program memory and a data memory for storing the program and the data necessary for said display control section, it is not necessary to read out the data from the main memory every time of processing.

In the invention of said aspect 8, said display control section can flexibly correspond to the change of the screen mode or the graphic area so as to transfer the information necessary for said program memory and said data memory from the main memory. Since the program or the data exceeding the capacity can be read out from the main memory, the capacity of the memory may be small.

In the invention of said aspect 9, it is not required to delete the data in the line memory every time each line is displayed, and the used line information in the line memory has only to be deleted for every period of vertical retrace, hence the processing can be performed at a high speed.

THE BEST MODES OF THE EMBODIMENTS OF THE INVENTION

The preferred embodiments of the present invention will now be described with reference to the accompanying drawings.

Figure 1:
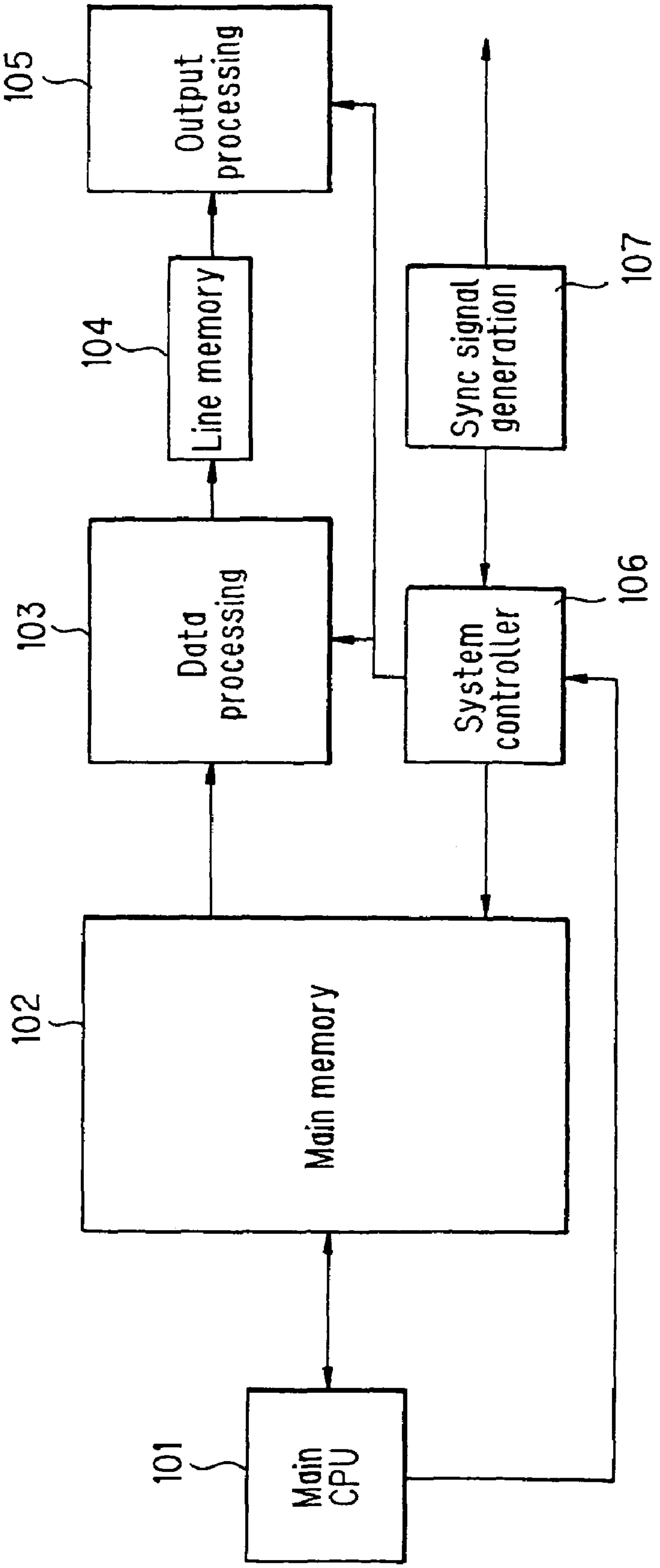
FIG. 1 is a block diagram showing one embodiment of the conventional image display device.
Figure 2:
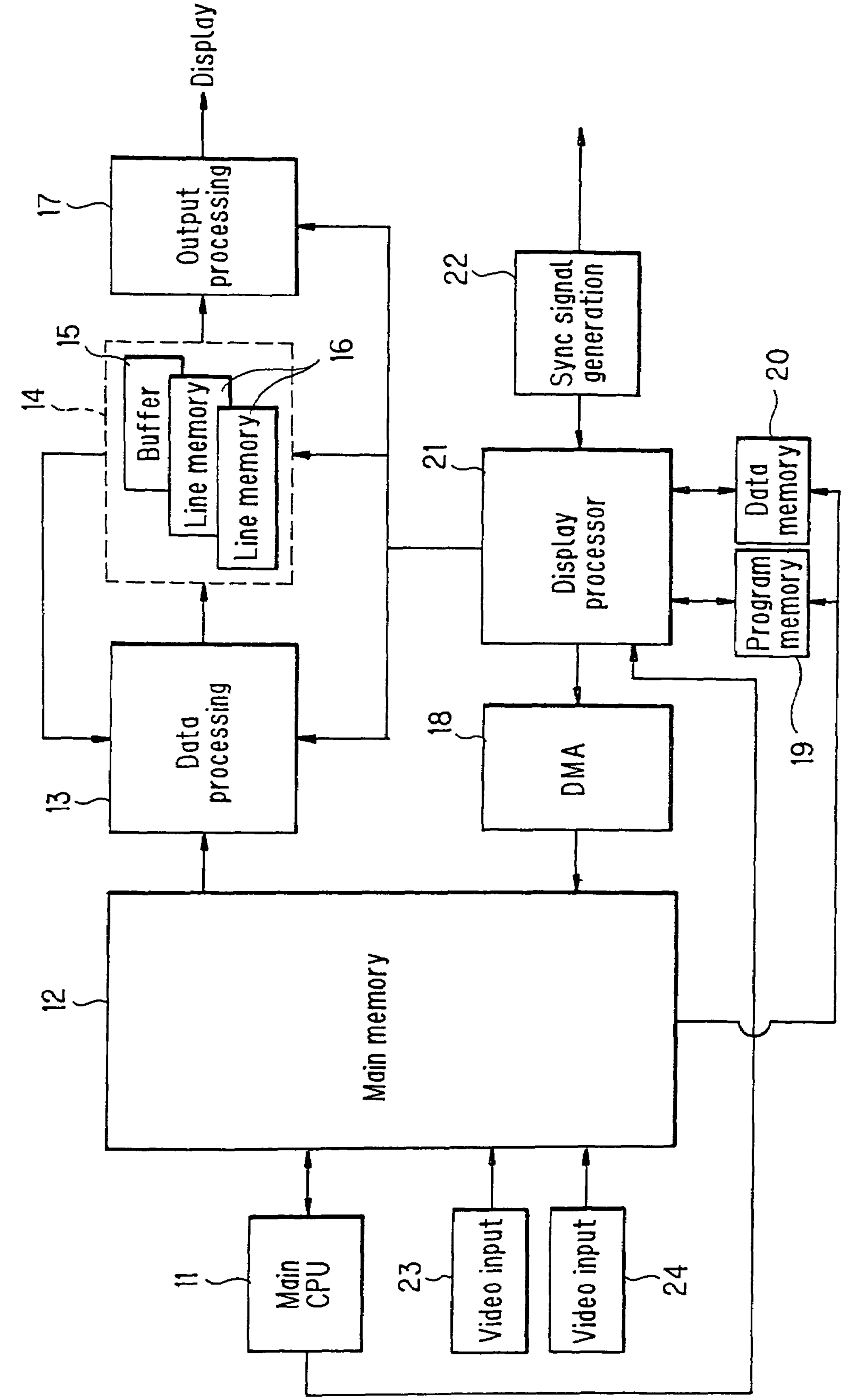
FIG. 2 is a block diagram showing one embodiment of the image display device according to the present invention.

FIG. 2 is a block diagram showing one embodiment of the programmable display device according to the present invention. This display device is composed of a main CPU 11, a main memory 12 for storing programs, display data and other data, a data processing circuit 13 which performs a processing for converting the display data in the main memory 12 into the data format for display, a display memory section 14 which stores the converted display data, an output processing circuit 17 which performs a processing for outputting the display data onto the screen, a DMA (Direct Memory Access) 18 which accesses to the data in the main memory 12, a program memory 19, a data memory 20, a display processor 21 which interprets the command and data described in the program memory 19 and the data memory 20, and mainly performs transfer or the like of the display data according thereto, a sync signal generating circuit 22, and video inputs 23, 24.

Figure 3:
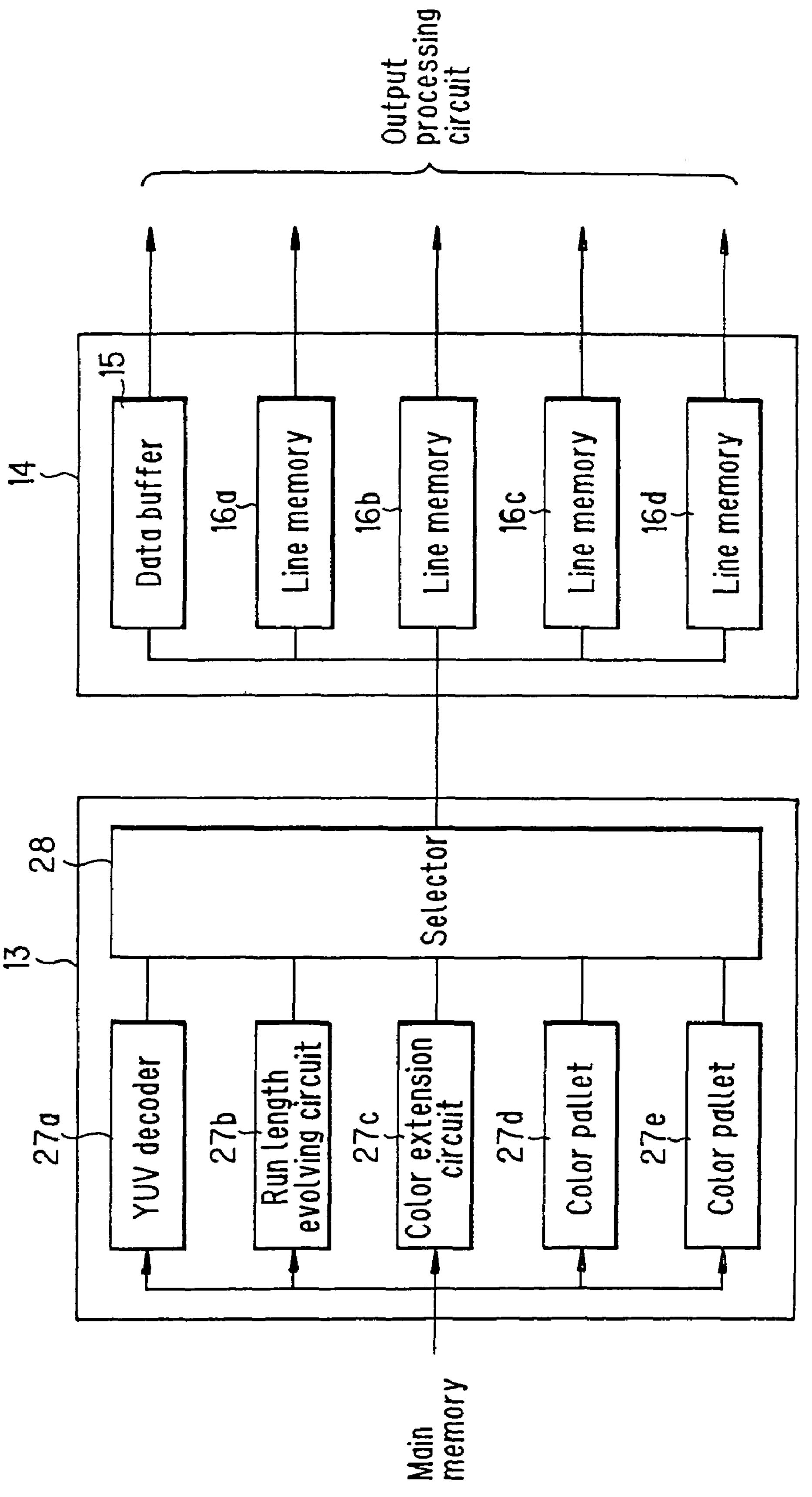
FIG. 3 is a block diagram showing the data processing circuit and the display memory section of this image display device.
Figure 4:
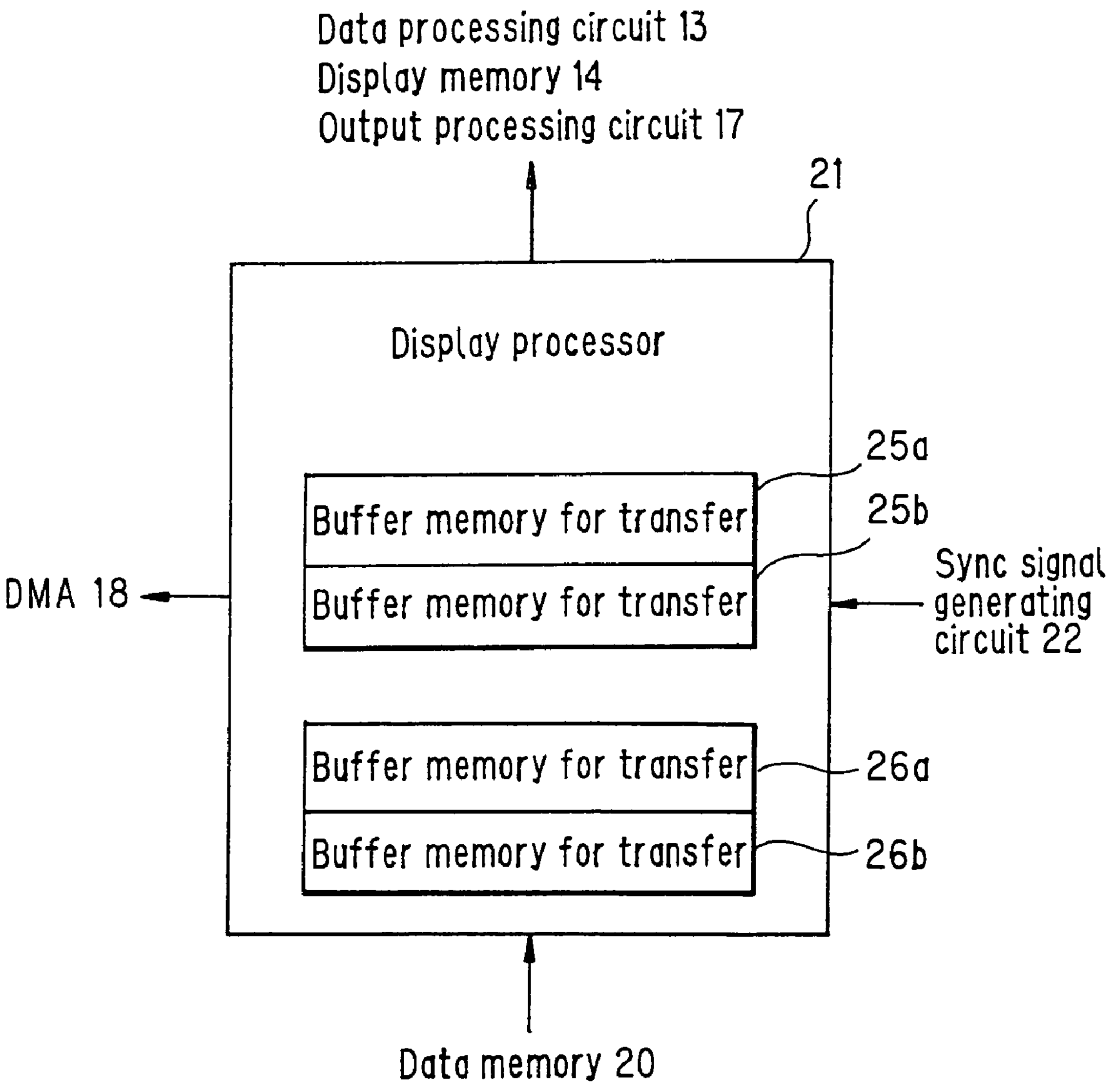
FIG. 4 is a block diagram showing the display processor of this image display device.

The data processing circuit 13 comprises, as shown in FIG. 3, an YUV decoder 27*a* which performs YUV→RGB conversion with respect to the display data transferred from the display processor 19, a run length evolving circuit 27*b* which performs the run length evolvement with respect to said display data, a color extension circuit 27*c* for extending the color data with respect to said display data, a plurality of processing circuits of a plurality of color pallets 27*d* and 27*e* for performing the pallet conversion with respect to said display data, and a selector 28. The display memory section 14 comprises, as shown in FIG. 3, a data buffer 15 which can be used for storing the pattern data of a cursor, and a plurality of line memories 16 for storing the data display data and the used line information. The output processing circuit 17 comprises a selector for selecting an optional line memory from the plurality of line memories 16, an attenuator for changing the brightness of the display data in order to realize the α-blending and an adder for adding its output, a selector which is used for synthesizing the repeated background data, cursor and the like, and a D/A converter for performing D/A conversion in order to display on the display, and the like. The display processor 21 has, as shown in FIG. 4, buffer memories for transfer, 25*a*, 25*b*, 26*a* and 26*b*.

This display device does not have a frame buffer for exclusive use, and takes the UMA (Unified Memory Architecture) structure which lodges the display data in the main memory 12, but it may have a structure that a frame buffer for exclusive use is included in the main memory 12.

The motion of this embodiment will now be described.

First, the general flow till the display data is actually displayed will be described.

The display data is stored mainly in the main memory 12 by the main CPU 11. These display data is read out by the DMA 18, and temporarily stored in the buffer memories 25*a* and 25*b* for transfer inside of the display processor 21 shown in FIG. 4. Then, after the display data is subjected to the motion such as expansion, contraction or skip and stored in the buffer memories 26*a* and 26*b* for transfer, the display data is converted to the data in a simple RGB format by the data processing circuit 13, and then stored in the line memory 16. The data written in the line memory 16 is read out for one pixel in conformity with the dot clock in the sync signal generated by the sync signal generating circuit 22. Then the data is subjected to the α-blending processing of two screens or synthesized with the repeated background data or cursor by the output processing section 17, D/A converted, output to the display together with the sync signal and displayed. This is the general flow till the display data is actually displayed.

In this display device, the control of a considerable portion of the display is performed by the display processor 21. The display processor 21 has a program memory 19 and the data memory 20 for exclusive use, interprets the programs and data stored therein and performs motions such as transfer of the display data and the like. The information of the program memory 19 and the data memory 20 is transferred from the main memory 12 according to need. A plurality of programs/data are stored in the main memory 12 according to the display structure, the change of the graphic area and the like.

The command to transfer the display data from the main memory 12 may be issued directly from the main CPU 11 to the display processor 21 or may be issued from the display processor 21 itself. It is mainly when the display mode(bit number showing the information of one pixel) is changed that the main CPU 11 issues the transfer command. And it is mainly when the program/data required for forming one screen is larger than the RAM capacity of the display processor that the display processor 21 itself issues the transfer command. At this time, the program/data is replaced in the middle of the display.

With such a structure, the information can be transferred according to need, hence the display device can flexibly correspond to the screen mode or the change of the graphic area. In addition, a program or data exceeding the memory capacity can be executed. Thus, the RAM of the display processor may have a small capacity. Accordingly, construction of a compact or a low-cost system becomes possible.

Moreover, when the motion of the display processor 21 is set and there is no need of change, the program memory 19 or the data memory 20 may be ROM. In this case, it is not necessary to transfer the data from the main memory 12. Since the ROM can have a smaller chip area compared to that of the RAM having the same capacity, it is advantageous from the standpoint of cost.

Figure 5A:
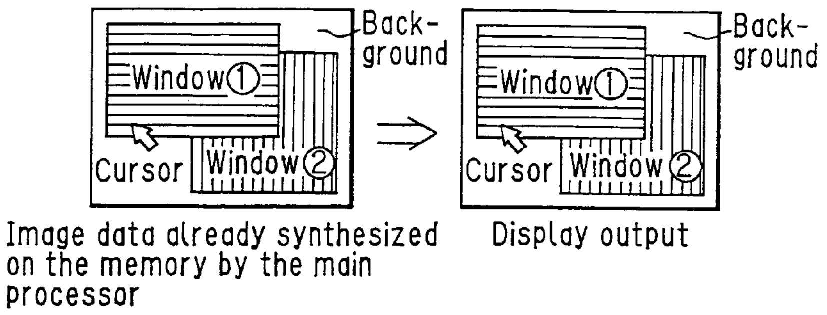
FIG. 5A~FIG. 5C are diagrams illustrating the display data of the main memory and the display output of the display.
Figure 5B:
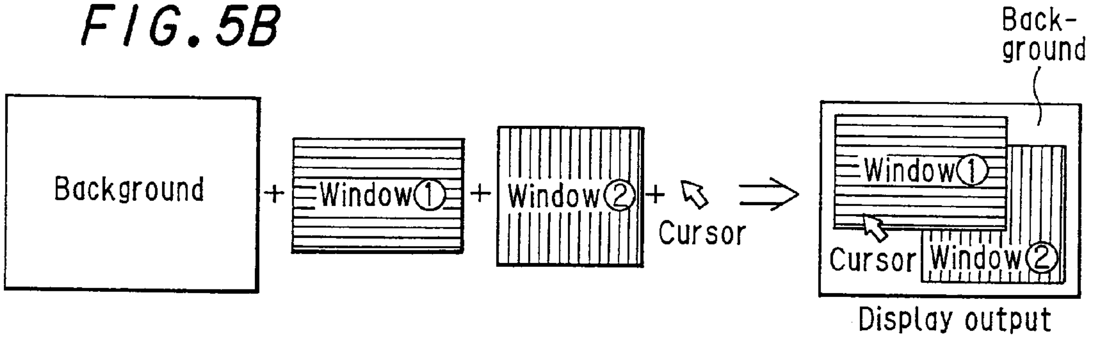
Figure 5C:
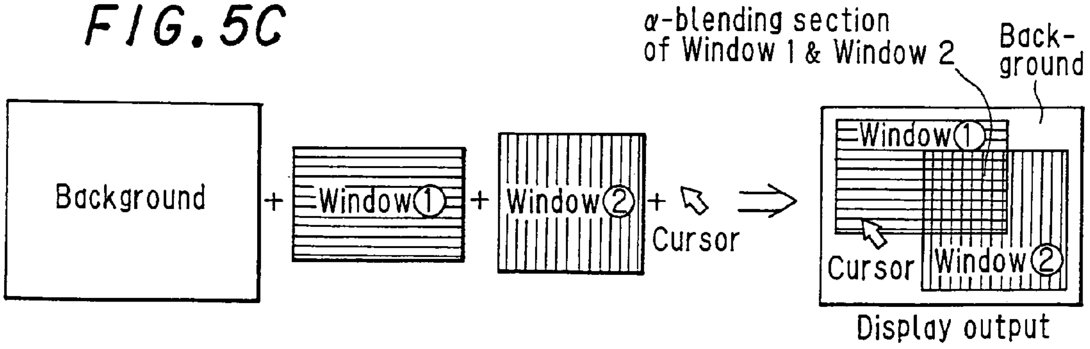

Next, the basic motion of the display processor 21 when a program is given to the display processor 21 to perform the screen display will be described. FIGS. 5A~FIG. 5C are diagrams illustrating the display data of the main memory 12 and the display output of the display. All of them are for storing the display data stored preliminarily in the main memory 12 in the line memory 16. Now explanation will be made for a case where a beta screen is displayed and a case where a number of windows and the like are synthesized and displayed.

The beta screen means that backgrounds, cursor, windows and the like are stored preliminarily in the main memory 12 as a synthesized beta screen data by the main CPU 11, as shown in FIG. 5A, and when the display is performed, the beta screen data is read out sequentially from the top address and transferred to the line memory 16.

When a number of windows are synthesized, there are two cases that the α-blending is not considered (see FIG. 5B) and that the α-blending is considered (see FIG. 5C). The α-blending means a semi-transparent synthesis, and for example, when two windows are superposed, only the window of this side in the superposed portion is normally displayed. But if the α-blending is set, the window of this side becomes transparent, and the window of back side can be seen. In other words, the α-blending means a function to synthesize a plurality of display data at a certain percentage and display them. On the other hand, the motion of the display processor 21 is related to the motion of expansion, contraction and skip, and the control of the data processing circuit 13 and the used line information, but these motions will be described later.

Figure 6:
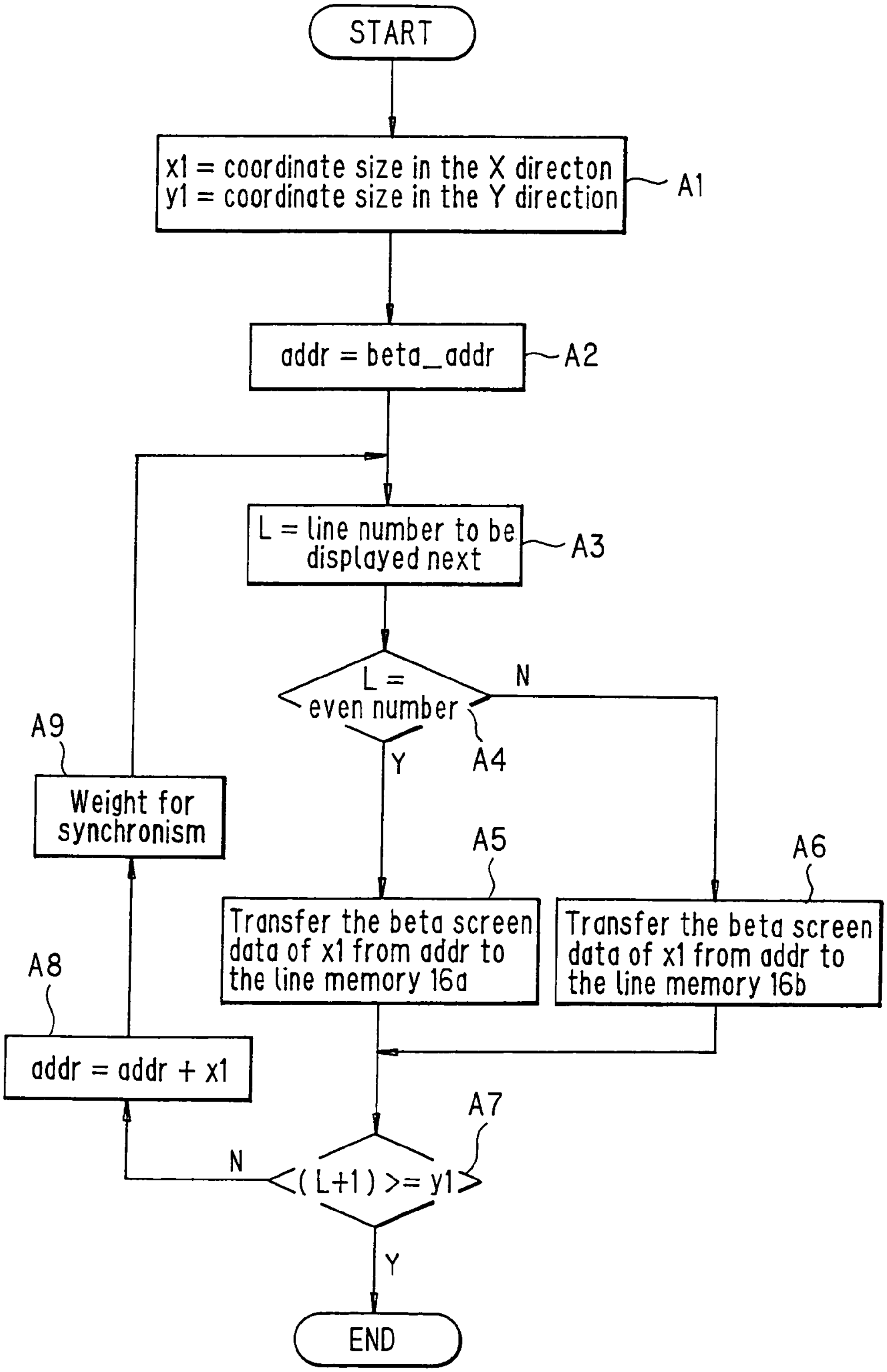
FIG. 6 is a flow chart for displaying beta screen data for one screen.
Figure 7:
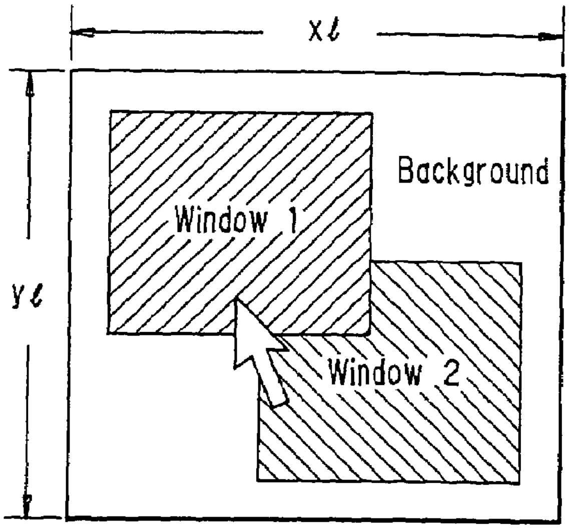
FIG. 7 is an example of the display screen of the beta screen.
Figure 8:
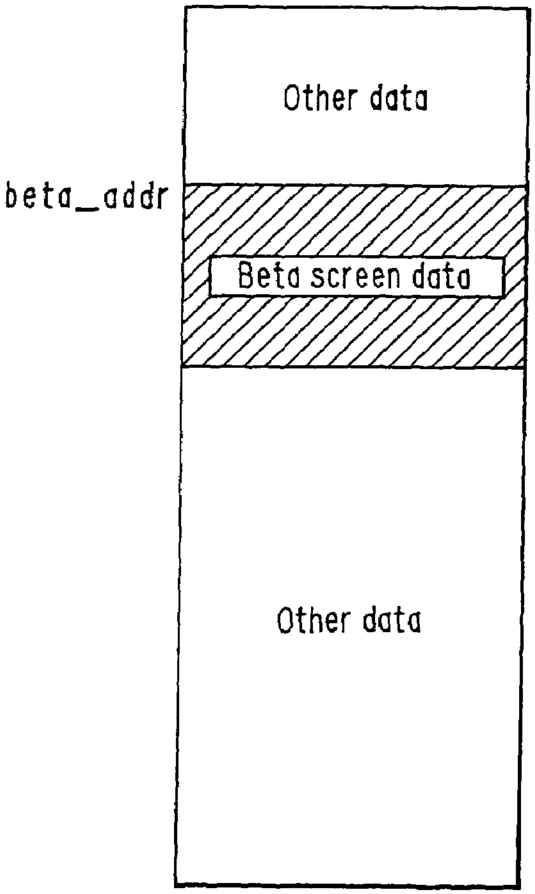
FIG. 8 is a memory map of the main memory in which the beta screen data is stored.

Next, the motion of the display device when these screen displays are performed will be described. FIG. 6 is a flow chart for displaying the beta screen data for one screen. FIG. 7 shows an example of the display screen at that time, and FIG. 8 shows a memory map of the main memory 12 in which the beta screen data is stored. First, in order to display one screen, in Step A1, the coordinate size x1 in the X direction of the beta screen data and the coordinate size y1 in the Y direction thereof are obtained.

Then, in Step A2, the top address beta_addr which stores the beta screen data in the main memory 12 is obtained as the top address addr which stores the beta screen corresponding to the line No. L. These data can be obtained as the immediate data which are fixed in the program, if they are fixed data. Furthermore, if they have optional sizes, these data existing in the main memory 12 may be obtained by transferring these data to the data memory 20 and referring to the data memory 20. In Step A3, the next horizontal line number following the horizontal line number now being displayed is obtained as the line No. L, and it is judged whether this value is even or odd in Step A4. Then, the data transfer in the x1 size is carried out from the top address addr which stores the beta screen data corresponding to the line No. L in the main memory 12 to the line memory 16*a* in Step A5 if it is even, or to the line memory 16*b* in Step A6 if it is odd.

The reason why the write to the line memory 16*a* and the line memory 16*b* is switched by the even and odd line numbers is that when the line memory is accessed on the display side, the access thereto is not possible from the display processor 21. By providing another line memory separate from the line memory being used for the display, the display processor 12 can access to the line memory even during the display.

After the data is transferred to the line memory 16*a* or the line memory 16*b*, in Step A7, the coordinate size y1 in the Y direction of the beta screen and the line No. L which is displayed next are compared. If the value of (L+1) is smaller than y1, in Step A8, the top address addr which stores the beta screen data corresponding to the line No. L is added by the coordinate size x1 in the X direction of the beta screen to obtain the top address addr which stores the beta screen corresponding to the next line number. The weight for synchronism (Step A9) controls the overwrite to the line memory by judging if the line memory 16*a* or the line memory 16*b* now being used for the display is still being used or not, that is, by writing to the line memory after waiting till the next horizontal display starts. It becomes possible to display for one pixel by performing transfer to the line memory 16 a or the line memory 16*b* described above y1 times.

Next, the description will be for the case where a plurality of windows and the like are synthesized and displayed.

In the display of the beta screen, the display data in the main memory 12 is sequentially read out from the top address and displayed, but the data at an optional position in the main memory 12 can be displayed in an optional combination by taking out an optional number of data, according to the program given to the display processor 21. For example, in the case of the window system, the display data of a plurality of windows are stored in the main memory 12 in a completed form in separate addresses, respectively, and according to the position of each window and the priority thereof, they can be displayed on a real time basis by superposing them.

Figure 9:
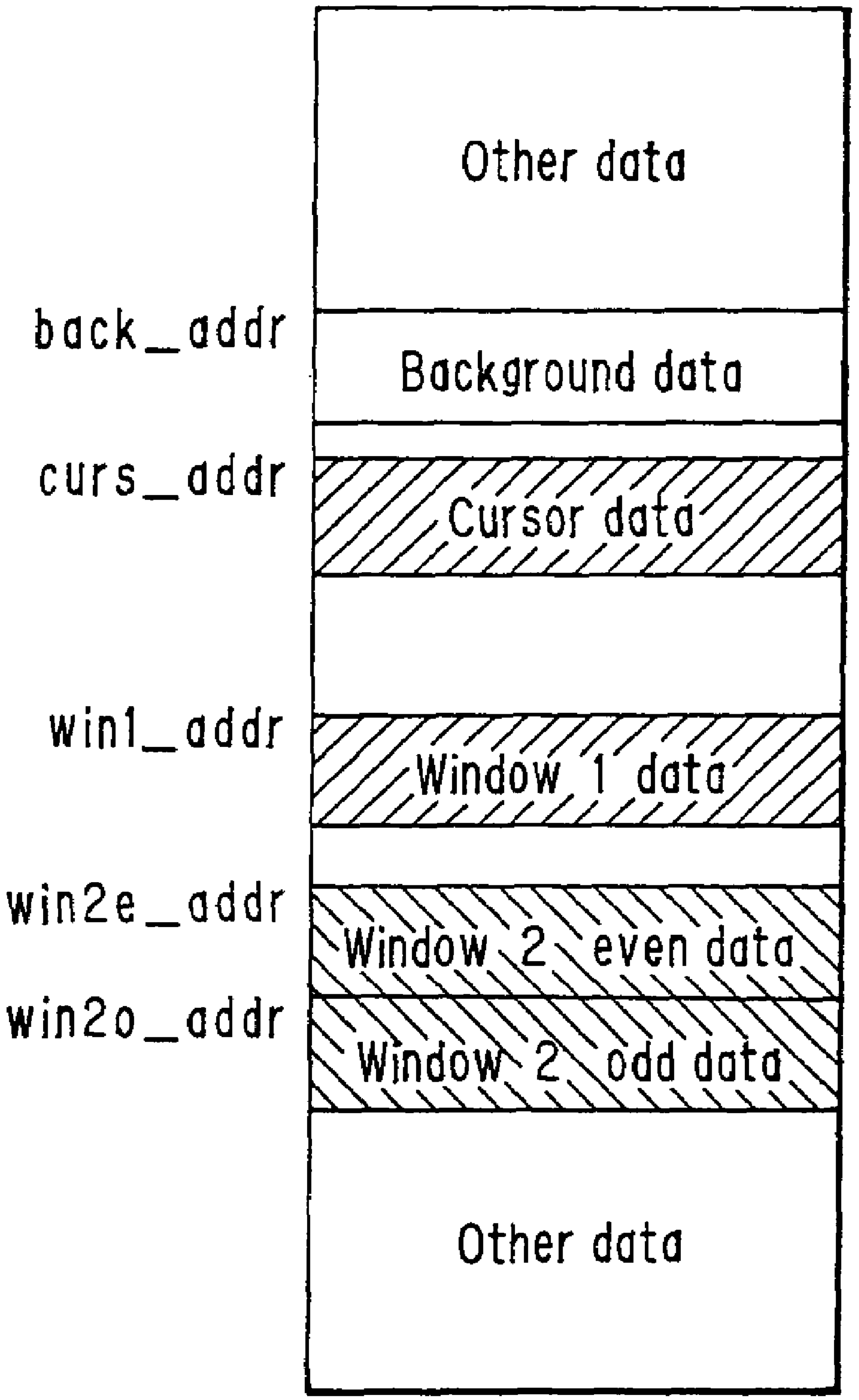
FIG. 9 is a memory map of the main memory in which various display data are stored.

Here, it is assumed that, as shown in the memory map of FIG. 9, various display data such as the background data, the cursor data, the window 1 data, the window 2 even data, the window 2 odd data and the like are stored in a completed form in optional address positions in the main memory 12. Among these display data, only the data which is displayed when it is synthesized is read out and transferred to the line memory. The window 2 even data and the window 2 odd data mean the data structures which are taken in as the even data and as the odd data per field when the interlace signal such as NTSC signal is taken in on the main memory 12. However, the display of the cursor will be described later.

Figure 10:
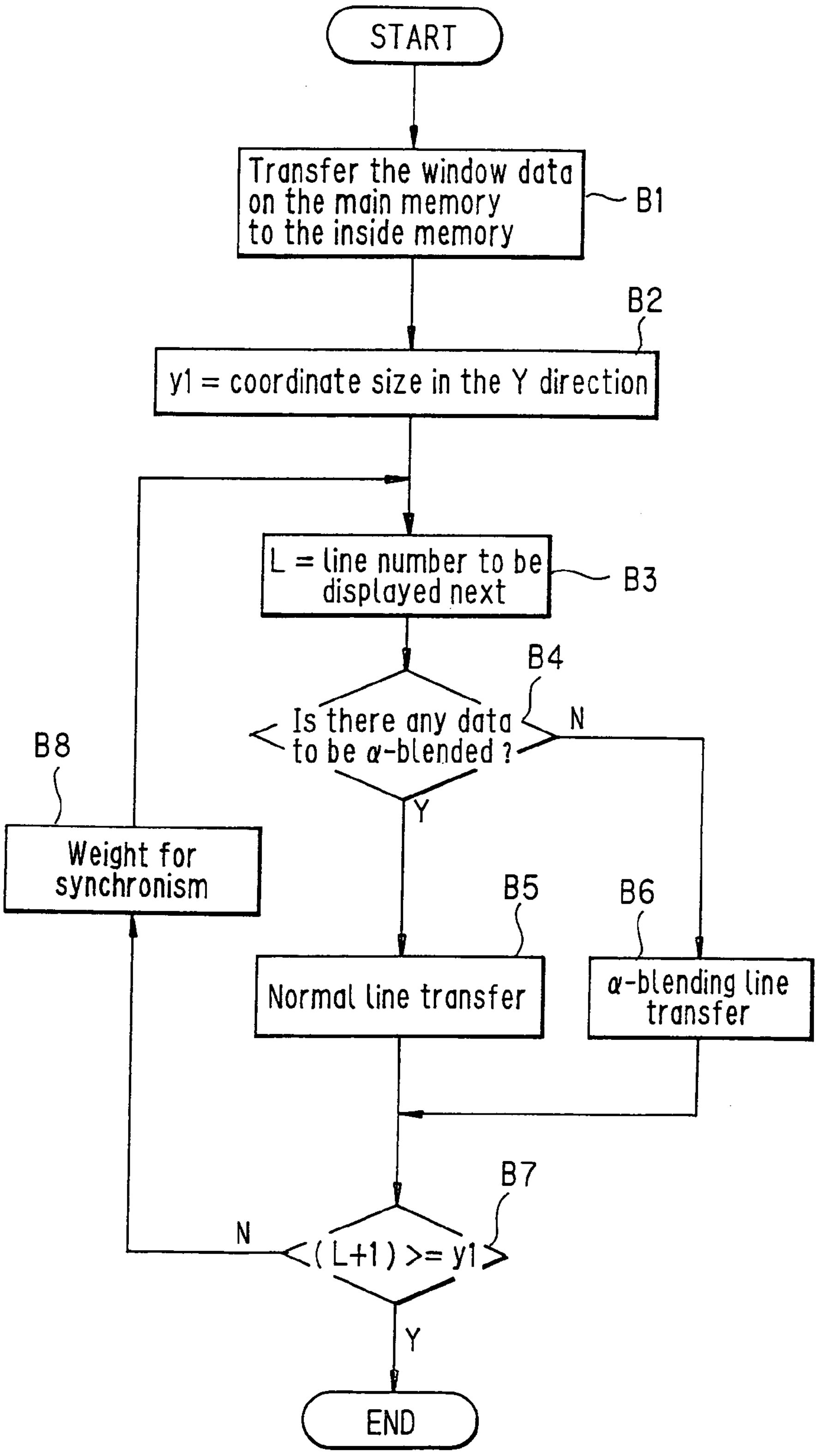
FIG. 10 is a flow chart for synthesizing and displaying a plurality of windows.

FIG. 10 is a flow chart for synthesizing and displaying a plurality of windows. It shows a motion that only the data displayed when the various data in FIG. 9 are synthesized and read out to display for one screen.

Since the display data such as window coordinates, priority and the like are optional data which may be changed at any time, every time one screen is displayed, the data transfer from the main memory 12 to the data memory 20 is performed by the display processor 21 in Step B1. In addition, in order to display one screen, the coordinate size y1 in the Y direction of the screen is obtained in Step B2, and the next horizontal line number following the horizontal line number now being displayed is obtained as the line No. L in Step B3. In Step B4, it is judged if it is subjected to the α-blending or not, and if the α-blending is not to be carried out, the normal line transfer is performed (Step B5), and if the α-blending is carried out, the α-blending line transfer is performed (Step B6). Next, in Step B7, the line No. L which is to be displayed and the coordinate size y1 in the Y direction of the screen are compared, and if the loop of y1 times is not completed, the processing of the weight for synchronism (Step B8) which controls the overwrite into the line memory is performed, and the display for one screen is performed by performing the above processing for y1 times.

Figure 11:
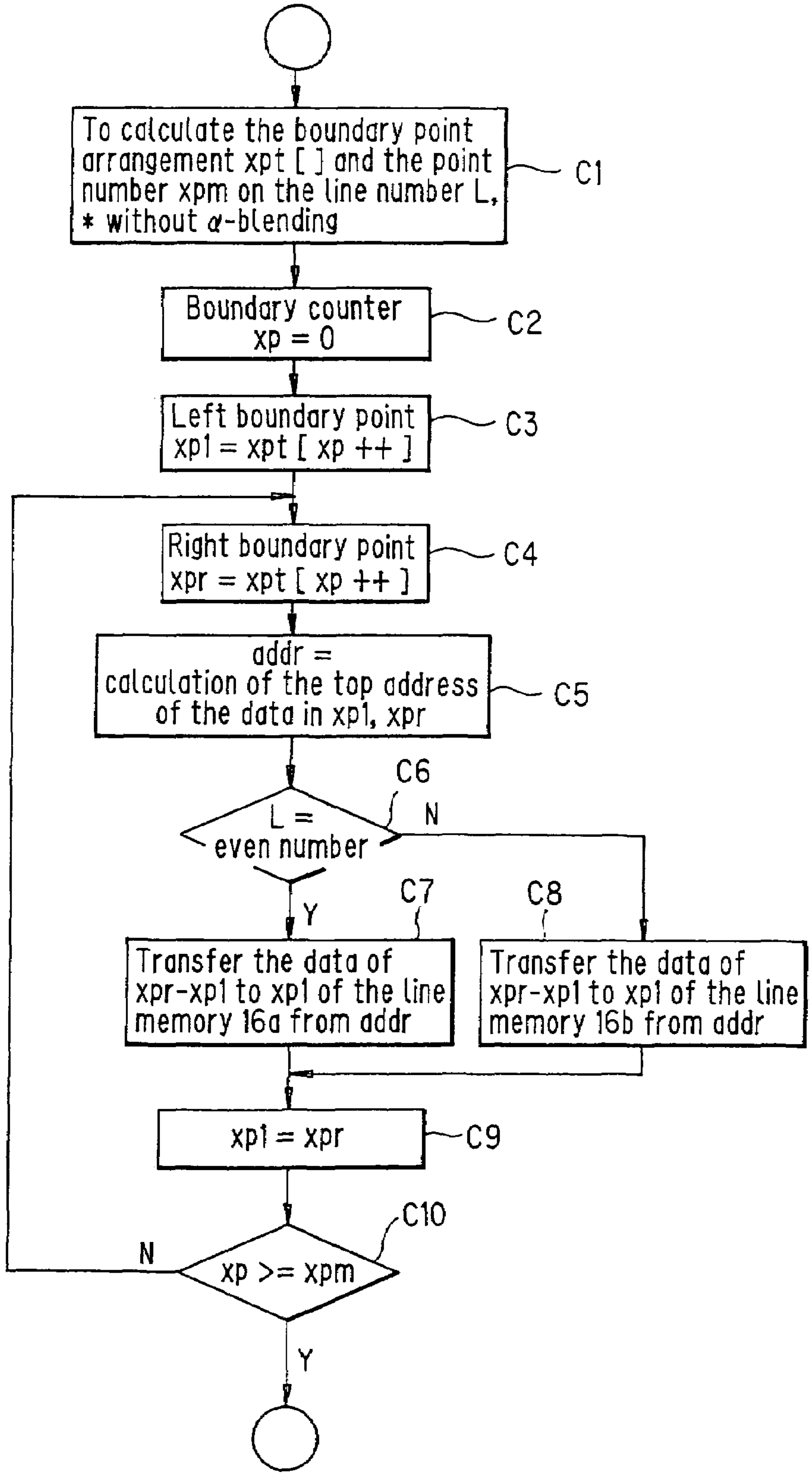
FIG. 11 is a flow chart of a normal line transfer without the α-blending.

FIG. 11 is a flow chart of a normal line transfer without the α-blending.

Figures 12A, 12B:
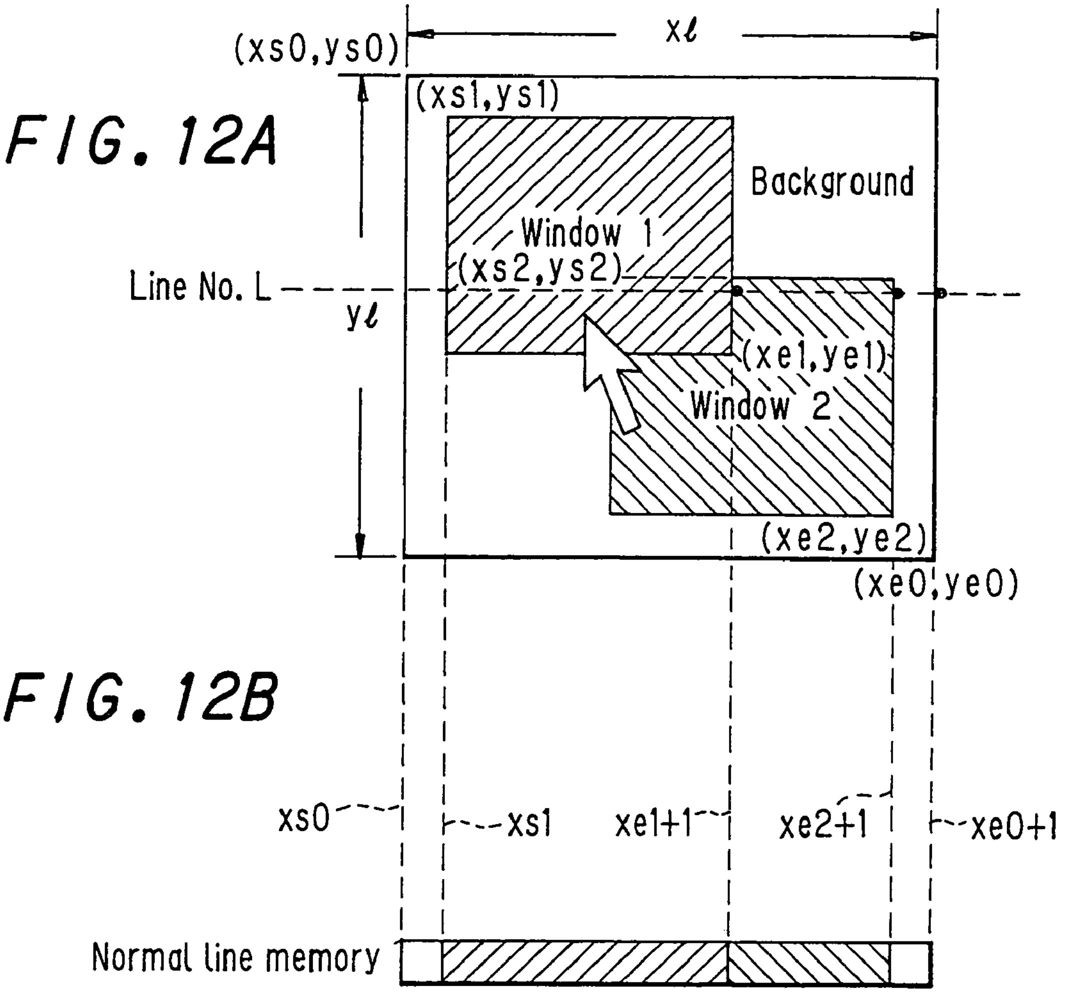
FIG. 12A is an example of the display screen without the α-blending.
FIG. 12B is a memory map of the line memory in the line No. L.

FIG. 12A is an example of the display screen without the α-blending, and FIG. 12B is a memory map of the line memory in the line No. L. Assuming that the line No. L in FIG. 12 is the line No. L to be displayed next, the normal line transfer on the line number will be described. In Step C1, the display processor 21 calculates the boundary point between respective display data on the line No. L without the α-blending and the point number. The display data of each window is transferred to the data memory 20, and the boundary points and the point number are calculated from the upper right coordinate, the lower left coordinate, the coordinate size in the X direction, the coordinate size in the Y direction, the priority and the like. Alternatively, the data calculated in advance by the main CPU 11 is transferred to the data memory 20, and the data may be obtained only by referring to the data memory 20.

The boundary point at this time is defined as xpt [ ] (in the [ ], a number showing the sequence order is entered), and the number of the boundary points is defined as xpm. As shown in FIG. 12A, the boundary points on the line No. L will be xpt [0]=xs0, xpt [1]=xs1, xpt [2]=(xe1+1), xpt [3]=(xe2+1), xpt [4]=(xe0+1), and the number of boundary points xpm will become 5. In Step C2, the boundary counter xp is cleared, and in Step C3, the left boundary point xpl on the line L is obtained, and in Step C4, the right boundary point xpr nearest to the left boundary point is obtained. The display data between these xpl and xpr is judged, and in Step C5, the top address addr which stores the display data corresponding to the line No. L is obtained. Initially, xpl =xpt [0]=xs0, and xpr=xpt [1]=xs1, therefore, it can be judged that this display data is the background data, and the top address addr which stores the background data corresponding to the line No. L can be obtained from addr=back_addr+x1*L+xs0.

In Step C6, it is judged if the line No. L is even or odd, and the data transfer to the line memory 16*a* (Step C7) or the data transfer to the line memory 16*b* (Step C8) is switched. The size of the data transfer to the line memory 16*a* and the line memory 16*b* becomes xpr−xpl, since the display area is xpl, xpr−1. Since the write position into the line memory 16*a* and the line memory 16*b* is xpl, the data transfer to the line memory 16*a* or the line memory 16*b* means that the data of (xs1−xs0) is transferred from addr to xs0 of the line memory 16*a* or the line memory 16*b*. The right boundary point xpr becomes the left boundary point xpl when the next data between xs1 and (xe1+1) is transferred, in Step C9, the left boundary point xpl can be obtained by making xpl=xpr. Then by moving to obtain the right boundary point xpr (Step C4) described above, and these motions are similarly performed between the boundaries xs1 and (xe1+1), (xe1+1) and (xe2+1), and (xe2+1) and (xe0+1), the data transfer of one line of the line No. L can be done. In Step C10, the boundary count xp and the boundary point number xpm are compared, and when the boundary count xp becomes the same with or larger than the boundary point number xpm, the processing of the next line is started.

Figure 13:
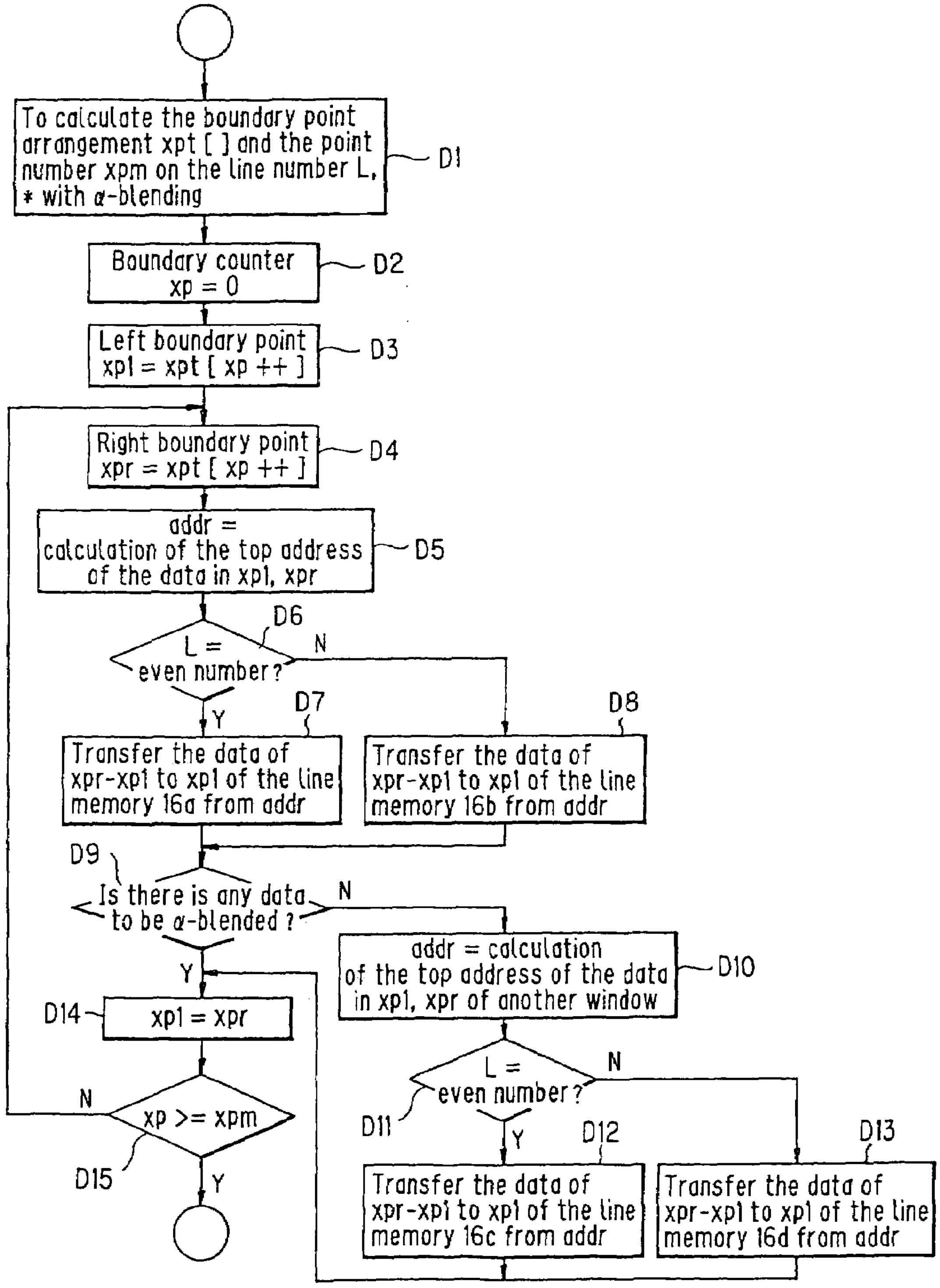
FIG. 13 is a flow chart of the line transfer including the α-blending.
Figures 14A, 14B:
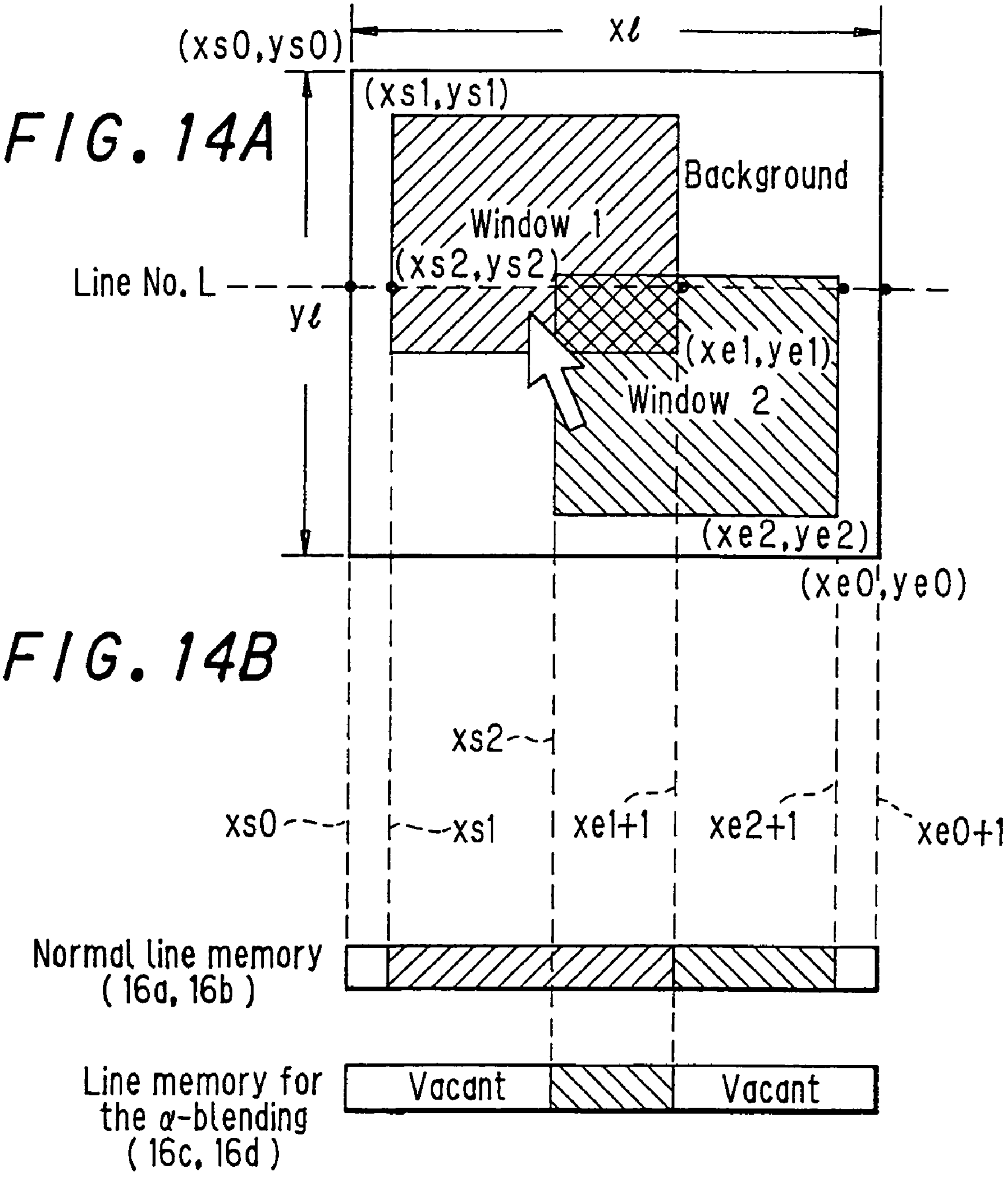
FIG. 14A is an example of the display screen with the α-blending.
FIG. 14B is a memory map of the normal line memory in the line No. L and the line memory for the α-blending.

FIG. 13 is a flow chart of the line transfer including the α-blending. FIG. 14 shows an example of the display screen including the α-blending. FIG. 14A is an example of the display screen of the α-blending, and FIG. 14B is a memory map of the normal line memory in the line No. L and the line memory for the α-blending. The α-blending line transfer on the line number, assuming the line No. L in FIG. 14 as the line No. L to be displayed next, will now be described. In Step D1, the display processor 21 calculates the boundary point between respective display data on the line No. L with the α-blending and the point number. The boundary point number is increased by 1 that the normal display screen example in FIG. 12. The boundary point and the point number are calculated from the upper right coordinate, the lower left coordinate, the coordinate size in the X direction, the coordinate size in the Y direction, the priority and the like. Alternatively, the data calculated in advance by the main CPU 11 is transferred to the data memory 20, and the data may be obtained only by referring to the data memory 20.

The boundary points on the line No. L will be xpt [0]=xs0, xpt [1]=xs1, xpt [2]=xs2, xpt [3]=(xe1+1), xpt [4]=(xe2+1), xpt [5]=(xe0+1), and the number of boundary points xpm will become 6. Since the boundary without the α-blending is the same as the normal line transfer, the case of the boundary counter xp with the α-blending will be described. The left boundary point xpl on the line L obtained in Step D14 will be xpl =xpr=xpt [2]=xs2, and xpr=xpt [3]=(xe1+1) by the acquisition of the right boundary point xpr in step D4. The top address addr which stores the window 1 data corresponding to the line No. L of this display data is calculated as addr=win1_addr+(xe1−xs1+1)*(L−ys1)+(xs2−xs1) (Step D5). It is then judged if the line No. L is even or odd in Step D6, and the data transfer to the line memory 16*a* (Step D7) or the data transfer to the line memory 16*b* (Step D8) is switched.

The size of the data transfer to the line memory 16*a* or the line memory 16*b* will become xpr−xpl, since the display area is xpl, xpr−1. Since the write position into the line memory 16*a* and the line memory 16*b* is xpl, the data transfer to the line memory 16*a* or the line memory 16*b* means that the data of ((xe1+1)−xs2) is transferred from addr to xs2 of the line memory 16*a* or the line memory 16*b*. After the completion of the data transfer, it is judged if there is another data to be α-blended or not with respect to the data in Step D9. In this case, the window 1 and the window 2 are to be α-blended, and the top address addr which stores the window 2 even data corresponding to the line No. L of this display data is calculated as addr=win2e_addr+(xe2−xs2+1)*(L−ys2) (Step D10).

It is then judged if the line No. L is even or odd in Step D11, and the data transfer to the line memory 16*c* (Step D12) or the data transfer to the line memory 16*d* (Step D13) is switched. The line memory 16*c* and the line memory 16*d* at this time are line memories for the α-blending. The size of the data transfer to the line memory 16*c* and the line memory 16*d* becomes xpr−xpl, since the display area is xpl, xpr−1. Since the write position into the line memory 16*c* and the line memory 16*d* is xpl, the data transfer to the line memory 16*c* or the line memory 16*d* means that the data of (xe1+1)−xs2) is transferred from addr to xs2 of the line memory 16*c* or the line memory 16*d*. Normally, the line memory can have the data not to be α-blended, and the line memory for the α-blending can have the data to be α-blended, separately, to make it possible to perform the synthesized display by the α-blending processing of the hardware. The following processing in the Step D14 and Step D15 is the same as the normal line transfer.

The display of the cursor can be also displayed by the motion procedure described above, but it is also realized by providing the coordinates of the cursor, the size in the X direction of the cursor, the size in the Y direction of the cursor, the top address curs_addr for storing the cursor data and the like after the transfer of the display data for one line to the line memory, and finally synthesizing and displaying them. When the display is made on the data of the α-blending, the cursor can be displayed by writing into both the normal line memory and the line memory for the α-blending. In this method, the cursor is always the top priority, and the processing speed can be increased. The basic motion of the display processor 21 has been described above.

Next, other motions performed by the display processor 21 will be described.

First, the processing of expansion, contraction and skip of the display data will be described. As shown in FIG. 4, the display processor 21 has two sets of the buffer memories for transfer therein. The display data read in from the main memory 12 is stored in the first set of the buffer memories for transfer 25*a* and 25*b*, and then stored in the other set of the buffer memories for transfer 26*a* and 26*b*, and thereafter stored in the line memory 16 for display. The readout and write between the buffer memories for transfer can be precisely controlled by the program provided to the display processor 21.

Specifically, processing can be done at an optional position per unit of a pixel, such as start/stop of the readout counter of the first set of the buffer memories for transfer 25*a* and 25*b* (referred to as "readout memory"), start/stop of the write counter into the other set of the buffer memories for transfer 26*a* and 26*b* (referred to as "write memory"), and whether the write is done or not, enabling the expansion or contraction of the display image, the expression that a right-hand side image from a certain position is slipped in the right direction and it looks like there is a hole in the image (referred to as "skip") and the change to the display data in which those are mixed become possible.

Figures 15, 16:
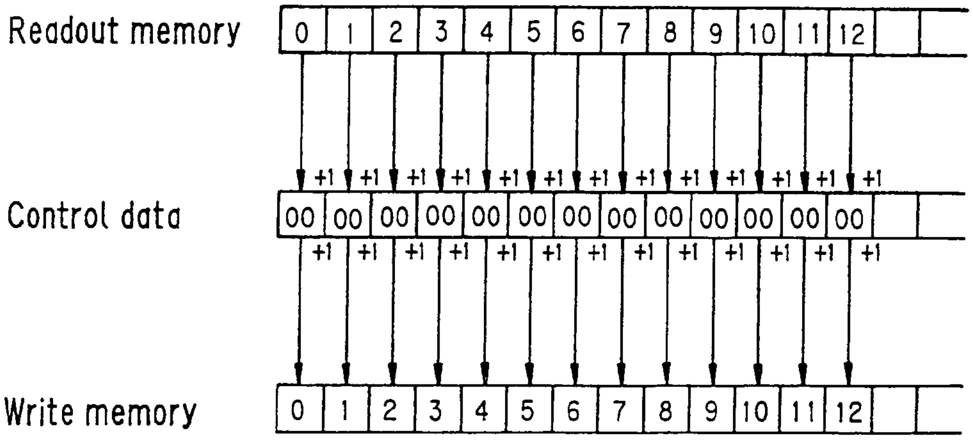
FIG. 15 is a diagram showing the motion of the control data.
FIG. 16 is a diagram showing the transfer motion between buffer memories for transfer when the size is the same as the original without expansion, contraction and skip.

The motion of the expansion, contraction and skip are controlled as shown in the diagram illustrating the motion of the control data in FIG. 15. The control data has 2 bits information for one pixel, and controls the readout counter and the write counter between the buffer memories 25*a*, 25*b*, 26*a* and 26*b* for transfer, or if the write is to be done or not, for each pixel unit. FIG. 16 is a diagram showing the transfer motion between the buffer memories for transfer when the size is the same as the original without expansion, contraction and skip, and in this case, "00" is continuously provided as the control data. Then, both the readout counter and the write counter are counted up by 1 continuously and the same data as the readout memory is written in the write memory, thus the data is transferred in the same size.

Figure 17:
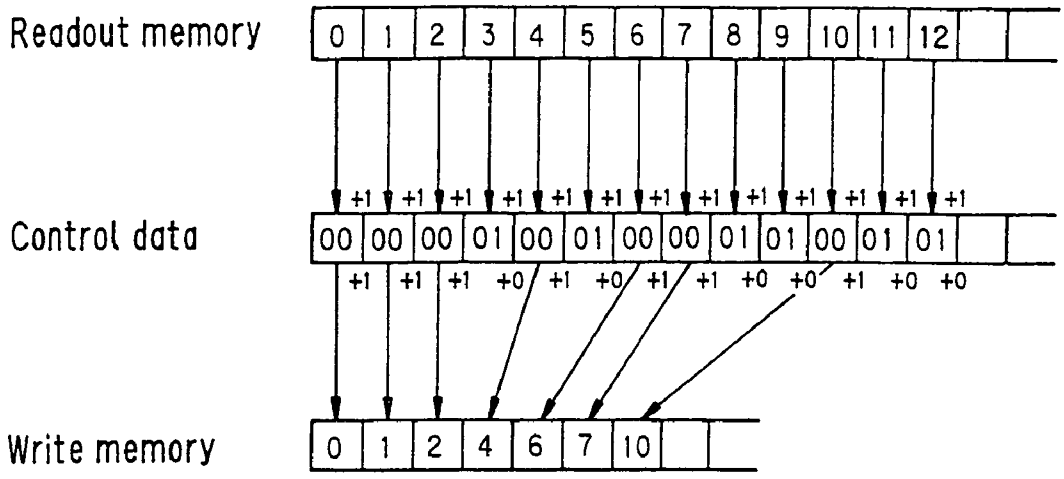
FIG. 17 is a diagram illustrating the contraction motion of the buffer memory for transfer.

When the data is contracted, provide "01" to the data corresponding to the pixel you want to omit in the control data. In FIG. 17 showing the contraction motion, the display data is written sequentially up to 0, 1, 2 and 3 into the write memory, but since the control data at a position 3 is "01", the write counter stops, and the data 4 is overwritten on the position 3. Thereby, the display data is contracted by one pixel. If the control data is set to "01" every other pixel, the horizontal direction of the image is contracted to ½, and if the rate to set "01" is changed partially, for example, the image becomes cylindrical shape.

Figure 18:
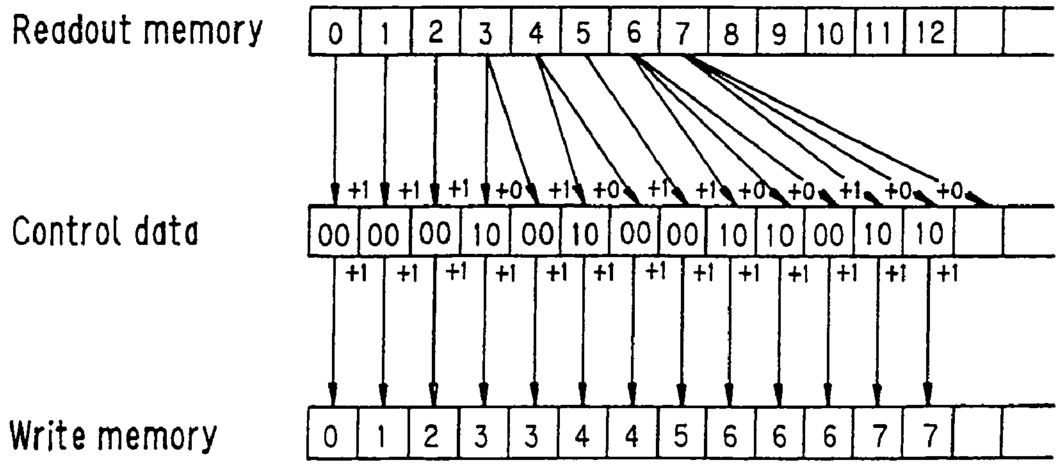
FIG. 18 is a diagram illustrating the expansion motion of the buffer memory for transfer.

When the data is expanded, "10" is set to the corresponding position of the control data. In FIG. 18, the display data is written sequentially up to 0, 1, 2 and 3 into the write memory, but since the control data at a position 3 is "10", the readout counter stops, and the data 3 is rewritten again to the next position of 3. Thereby, the display data is expanded by one pixel.

Figure 19:
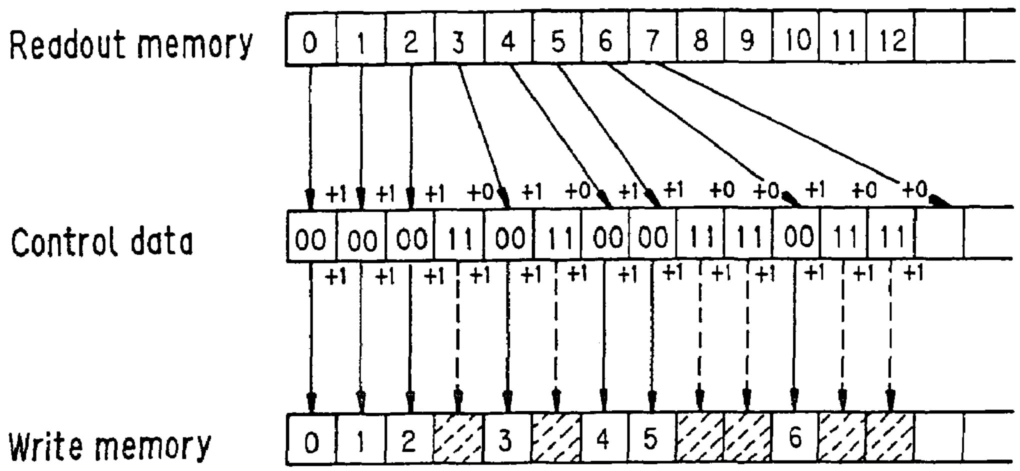
FIG. 19 is a diagram illustrating the skip motion of the buffer memory for transfer.

When the control data is "11", it is skipped. In FIG. 19, up to 0, 1 and 2, the data is written as it is, but since the control data of position 3 is "11", the readout address stops. Hence, the display data of position 3 is written in the next pixel on the right side. In addition, write to the write memory is not performed, and nothing is written in the position 3 of the write memory. Thus, the skip for one pixel is performed.

Figure 20:
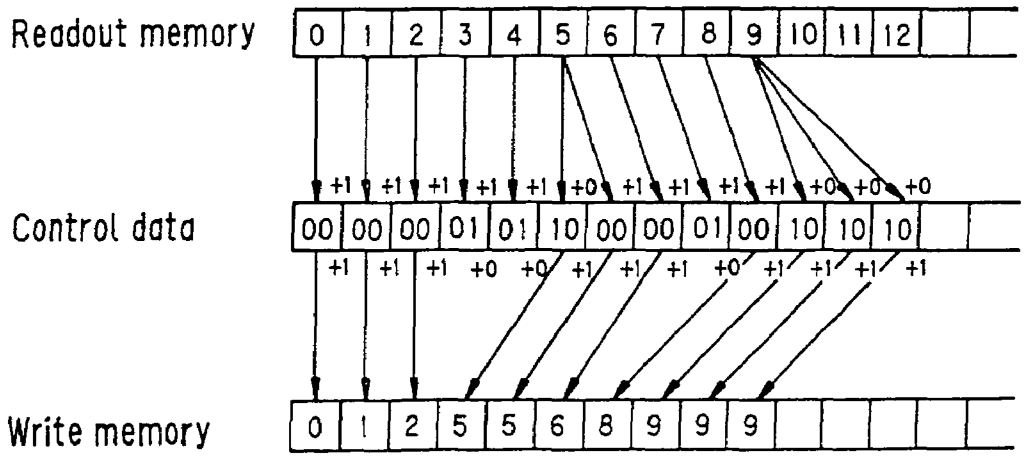
FIG. 20 is a diagram illustrating the motion of the buffer memory for transfer, in which expansion, contraction and skip exist together.
Figure 21:
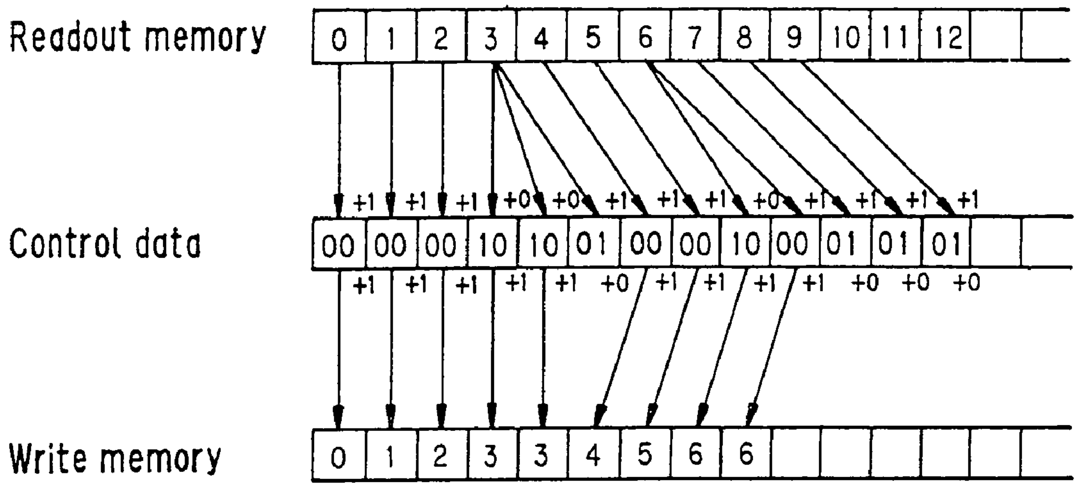
FIG. 21 is a diagram illustrating another motion of the buffer memory for transfer, in which expansion, contraction and skip exist together.
Figure 22:
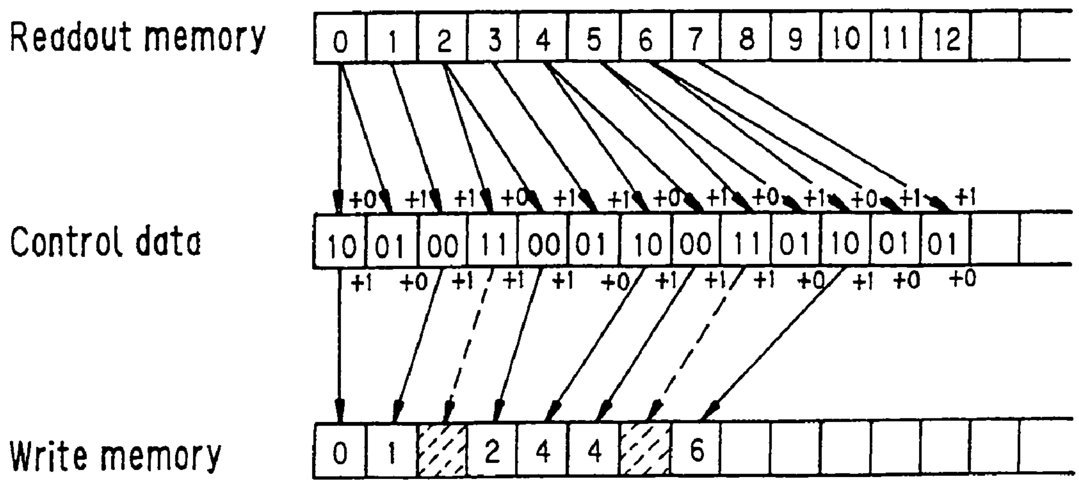
FIG. 22 is a diagram illustrating still another motion of the buffer memory for transfer, in which expansion, contraction and skip exist together.

As described above, by setting the value of the control data, expansion, contraction and skip are possible. Furthermore, by setting the expansion, contraction and skip in combination, as shown in FIG. 20 to FIG. 22, the display data is expanded partially, and contracted partially, thus a complicated modification of the display data is possible.

Figure 23:
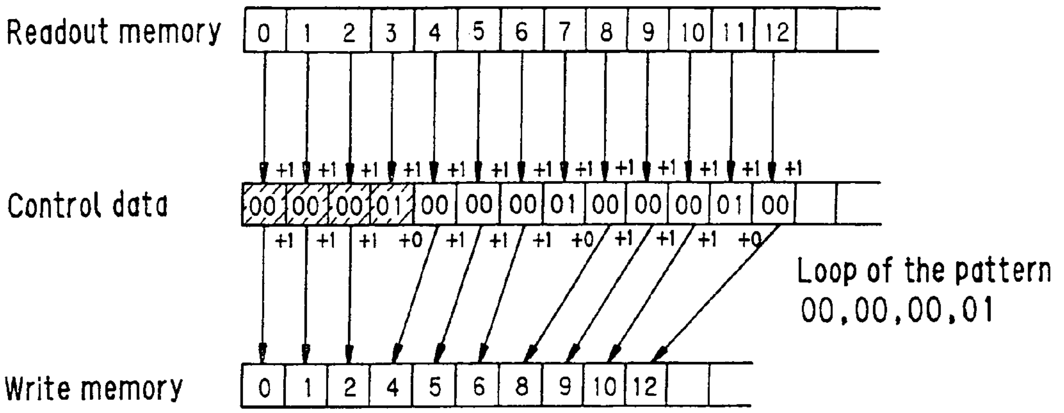
FIG. 23 is a diagram illustrating a contraction motion at a certain magnification of the buffer memory for transfer.
Figure 24:
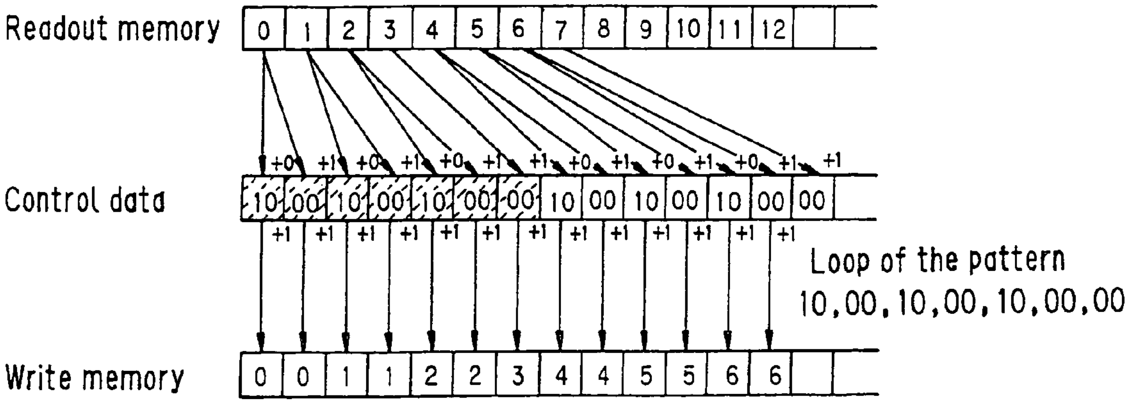
FIG. 24 is a diagram illustrating an expansion motion at a certain magnification of the buffer memory for transfer.

In many cases, the expansion and contraction rate is constant in the horizontal direction, and in these cases, the control data is repeated in the same pattern. In the present embodiment, by setting the repeated patterns and the repeated points, the expansion, contraction and the like can be specified with a fewer data compared to the case where the control data for one horizontal line is written. For example, when the data is contracted to 0.75 times, the control data will be repeated in the order of "00", "00", "00" and "01", as shown in FIG. 23. In this case, by setting the control data for 4 pixels and the repeated point so that repetition is performed per a unit of 4 pixels, the same control data is repeatedly used to perform the contraction motion. FIG. 24 shows the case where the data is expanded similarly to 1.75 times.

In the present embodiment, 2 kinds of video input are provided, and the display processor 21 can take in the video image data thereby. The video image signal is stored in the line memory for the video input, after being A/D converted. There are two line memories for the video input per one kind of video input, and they are used for readout and for write by switching alternately, as in other line memories. The video data written in the line memory for the video input is read out by the display processor 21, and after being subjected to the processing of expansion, contraction and skip, transferred to the line memory 16.

Next, the data processing circuit 13 will be described. The display data stored in the main memory are stored not only in a normal RBG format but also in various data format. While the display data is read out from the main memory 12 by the display processor 21 and written into the line memory 16, the display data in various kinds of data formats are converted to the RBG format through the processing circuits, such as the YUV decoder 27*a*, the run length evolving circuit 27*b*, the color extension circuit 27*c* and the color pallet 27*d*, 27*e*, and stored in the line memory 16. The display processor 21 instructs the selector 28 which data processing circuit is to be selected for the conversion for every pixel. There can be a plurality of color pallets, and for example, a pallet can be changed for every window. Moreover, other data processing circuits may be added, thereby the display processor 21 can correspond to various formats of the display data.

The display data past through the data processing circuit 13 is written in the line memory 16, but some values among the display data can be set as a write-through data which is not actually displayed. When the display processor 21 transfers the display data from the main memory 12 and the data buffer 15 to the line memory 16, if there is the write-through data, the pixel of that portion is not written in the line memory 16. It is effective for the display of an image which is not a rectangle, for example, a mouse cursor.

Next, the motion for displaying a screen by using the used line information will be described. Normally, the line memories for display function in a pair. This is because the display processor 21 cannot access for the write to the line memory which is now performing readout for the display, thus the display processor 21 writes the display data in the next line to the other line memory independent from the line memory which is now performing readout. Every time the line to be displayed is changed, the line memories which perform readout and write are alternately switched to continue the display. However, when a plurality of screens are synthesized and displayed, as shown in FIG. 5B and FIG. 5C, and when the background is not particularly displayed, in some cases, write of the display data into the line memory is only performed with respect to the portion where the window is displayed, and the display data of the former line remains in other portions. Therefore, it is required to clear the line memory before the write, and the time for clearing becomes necessary. The used line information makes it unnecessary to clear the line memory.

The used line information corresponds to the display data of each pixel on the line memory at a ratio of 1:1, and shows in which line the display data is used. The used line information corresponding to one pixel of the display data is more than the bit numbers (if the screen size is 1280×1024, 11 bits) which can express (the number of pixel in the vertical direction of the screen+1), and for the same numbers of the pixels as the display data in each line memory, that is, for the numbers of the horizontal pixels.

Figure 25:
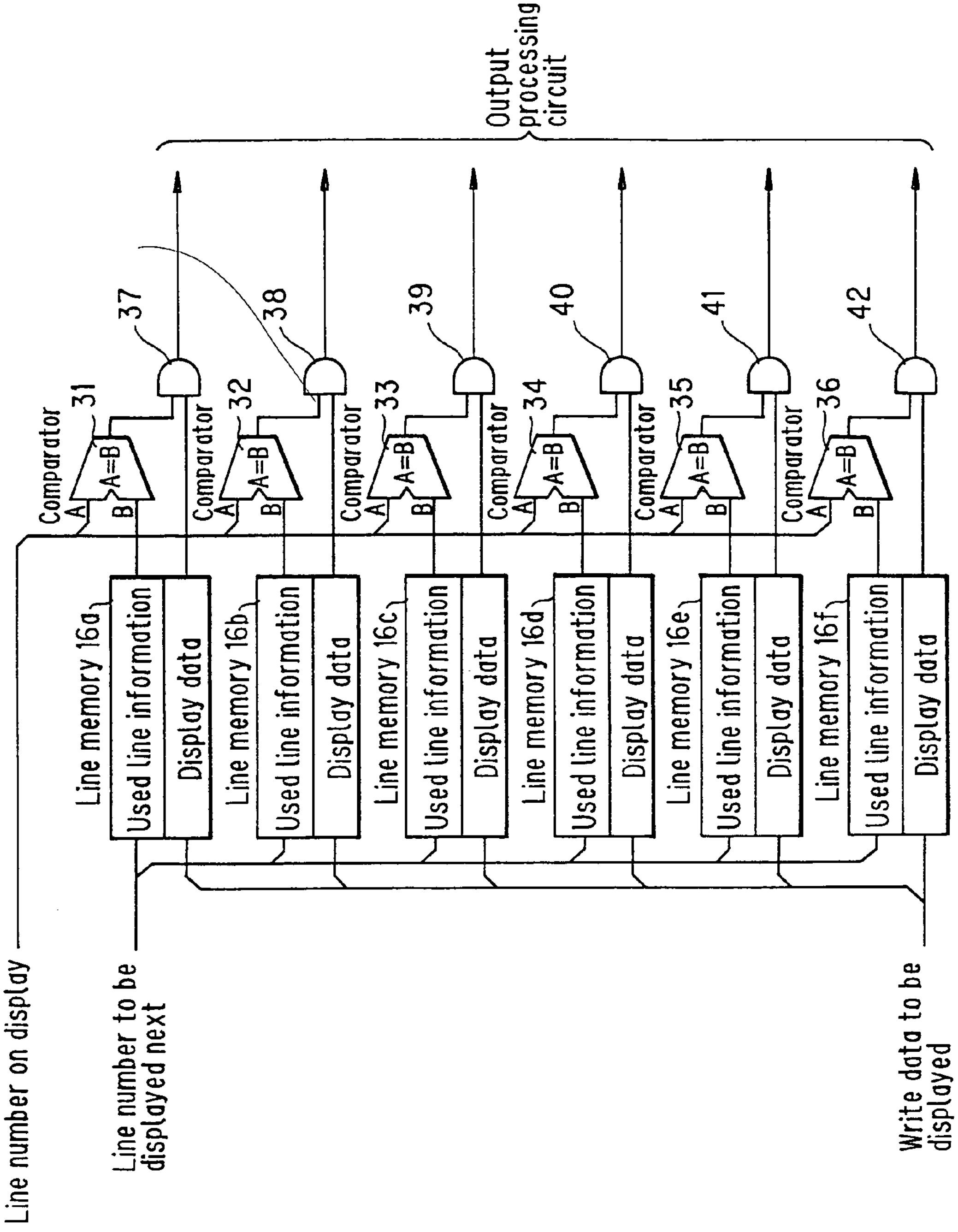
FIG. 25 is a block diagram showing the display memory section for storing the used line information.

FIG. 25 is a block diagram showing the display memory section 14 for storing the used line information. To the line memories 16*a*~16*f* are connected comparators 31–36 and AND circuits 37~42, respectively. The line memories 16*e* and 16*f* are the memories to store the background data described below. The comparators 31–36 compare the display line numbers and the used line information, and if the values agree, output the theoretical value 1, and if the values do not agree, output the theoretical value 0. The AND circuits 37–42 output the display data as it is when the theoretical value 1 is input, and do not output the display data when the theoretical value 0 is input.

Figure 26A:
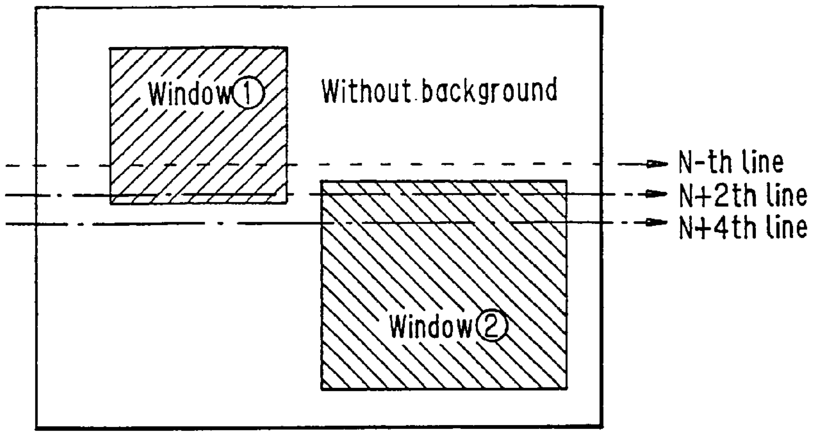
FIG. 26A is an example of the display screen.
Figure 26B:
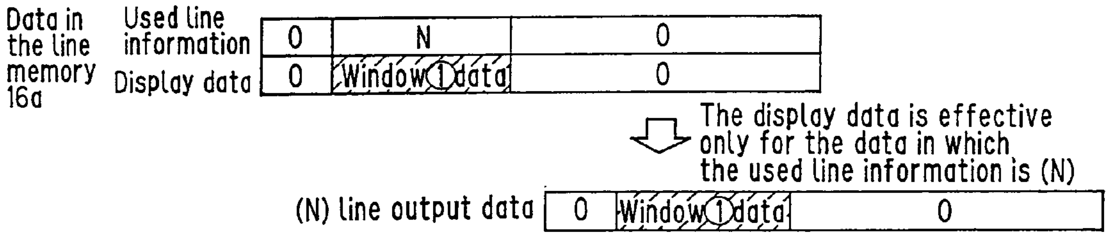
FIG. 26B is the memory map and the output data of the line memory when the used line information is N.
Figure 26C:
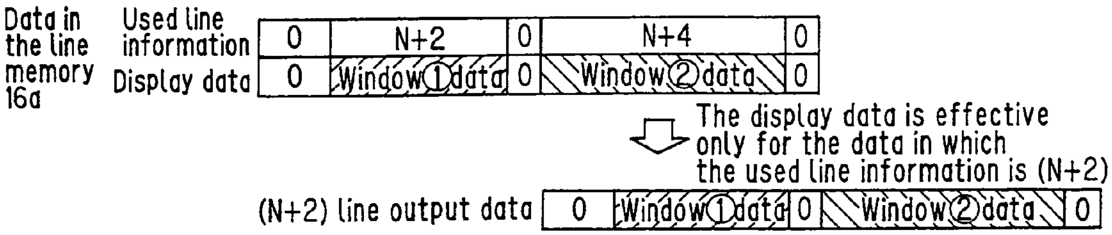
FIG. 26C is the memory map and the output data of the line memory when the used line information is N+2.
Figure 26D:
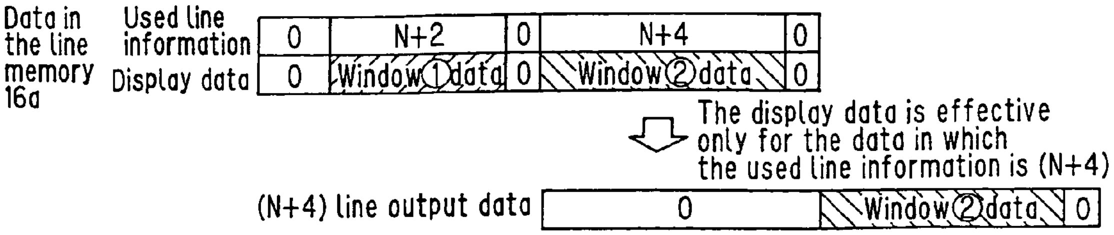
FIG. 26D is the memory map and the output data of the line memory when the used line information is N+4.

Now, the motion to display the screen will be described based on FIG. 26. FIG. 26A is an example of the display screen, FIG. 26B is the memory map and the output data of the line memory when the used line information is N, FIG. 26C is the memory map and the output data of the line memory when the used line information is N+2, and FIG. 26D is the memory map and the output data of the line memory when the used line information is N+4. As shown in FIG. 26B, while the display of the (N−1)th line is being performed, the display processor 21 writes the display data of the Nth line in the line memory. In the Nth line, there is window 1, and while the display data of the window 1 is written, N is simultaneously written in the used line information. When the Nth line is displayed, the line number N which is being displayed and the used line information are compared for every pixel of the line memory, and only when they are identical, it is considered that the display data is effective, and the display data in the line memory is output.

The write into the same line memory is done in the (N+2)th line, because the two line memories are used alternately. As shown in FIG. 26C, in the (N+2)th line, there are window 1 and window 2, and (N+2) is written into the display data and the used line information. Thus, the display is performed.

Next, the write of the (N+4)th line is performed. The (N+4)th line is only for window 2, and as shown in FIG. 26D, (N+4) is written into the display data and the used line information. At this time, the data of window 1 which was written in the (N+2)th line remains, and if processing is carried out without taking any particular measure, the above will be displayed, subsequently a wrong display comes out. In the present embodiment, however, the used line information of the portion of the old window 1 remains (N+2) which subsequently is ignored, and only the window 2 is displayed correctly.

The display for all lines are performed as described above, it is required to clear the used line information of all the line memories for every vertical retrace period. It is to prevent the display data of the previous vertical display period from being displayed. Clearing is performed by writing an unused value as the used line information.

Next, the repeated display of the same pattern will be explained. As is often seen in the background screen of the window system, sometimes the same pattern is repeatedly displayed in the horizontal direction. In this case, by making it possible to loop the readout address read out from the line memory 16 in an optional range, a particular pattern can be repeatedly displayed. Thereby, in particular, in the case where the background data is stored in the main memory 12, the data volume to be read out can be reduced, hence the traffic of the data bus of the main CPU 11 can be reduced. When using this function, it is necessary to have a pair of line memories 16*e* and 16*f* for exclusive use for storing the repeated pattern other than the normal line memories. Therefore, it is necessary that the line memories are at least 4, and when the α-blending is simultaneously used, at least 6. This repeated display function of this specific pattern will now be described.

Figure 27:
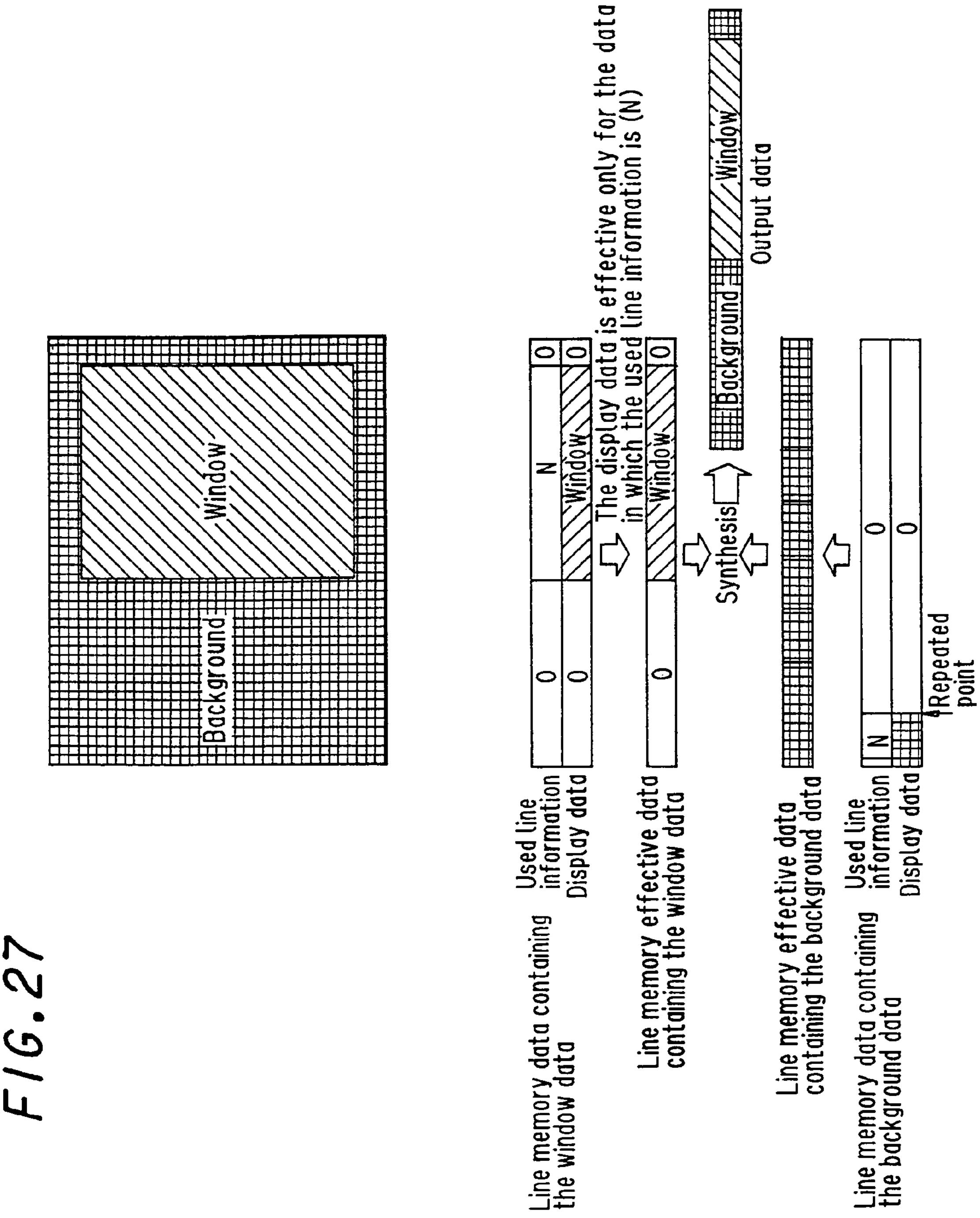
FIG. 27 is a diagram illustrating the motion when the background is repeatedly used.

FIG. 27 is a diagram illustrating the motion when the background is repeatedly used. When the data of the Nth line is written to the line memory, first the display data of the window and the used line information N are written in the line memory which stores the window data, as in the normal case. Next, the display data of the background and the used line information N are written in the line memory which stores the background data, and the repeated point is set. There are several methods to set the repeated point, such as a method to provide a register for exclusive use, to write a value distinguishable from the normal case into the used line information and the display data, or to prepare a line memory for exclusive use.

In order to display, first compare the used line information in the line memory for storing the window data with the line number being displayed. If they agree, the display data of the window is output, and if they don't agree, the background data is output. Though the background data is not shown, the background data shown by the background data readout counter inside thereof is output. If the value of this readout counter agrees with the value of the repeated point, the value of the readout counter is cleared. The background data output thereby returns to the initial stage of the line memory for storing the background data, and the background data is output repeatedly.

Next, the data buffer 15 will be described. Normally, the display data is stored in the main memory 12, but the display data in which the size of cursor is small, and the pattern is set may be stored in the data buffer 15. The display data stored in the data buffer 15 can be written in the line memory 16 by the display processor 21. Moreover, the display data can be transferred not to the line memory 16, but to the program memory 19 or the data memory 20 of the display processor 21, or the main memory 12, therefore, the display data can be used for the general purpose, not limited to the display of the cursor.

Furthermore, there are several methods to set the combination ratio of two screens by the $\alpha$-blending. One of them is to prepare a register for exclusive use which stores the combination ratio and read out the combination ratio from the register at the time of $\alpha$-blending. In this case, it is necessary for the display processor 21 to rewrite the content of the register every time the combination ratio is changed. Another method is to prepare a LUT which stores a plurality of combination ratio, and write the display data together with the call address of the LUT for every pixel, and the other method is to write the combination ratio directly to the line memory for every pixel.

INDUSTRIAL APPLICABILITY

According to the invention of the aspect 1, the display data of the portion required at the time of display is taken out from the main memory and used. Therefore, it is possible to take out the data at an optional position in the main memory and combine them optionally. This control is performed by the display control section, thus the processing load of the main control section in the software can be reduced when a plurality of windows are simultaneously displayed on the screen. Hence, the speed of movement and switching of each window can be increased.

According to the invention of the aspect 2, when the data in the line memory is read out, and if the data is to be repeated in the line direction (as the background in the window system), the readout line memory address can be looped in an optional position. Hence, redundant processing is not necessary and the processing can be performed at a high speed.

According to the invention of the aspect 3, since the cursor and the repeated background can be stored in the data buffer memory, it is not necessary to read out the routine data from the main memory. Thus, the load of the data bus can be reduced, redundant processing is not necessary and the processing can be performed at a high speed.

According to the invention of the aspect 4, it is not necessary to perform the expansion/contraction processing with respect to the data for the display in advance, since the expansion/contraction processing is performed when the display data is read out, hence the efficiency of using the bus can be increased. In addition, when the video input picture is displayed, it is normal that the change of the picture size is required, but by performing the expansion/contraction processing at the output stage, the expansion/contraction circuit can be utilized more effectively. Thereby, while taking in the video data always in a full size, the display can be set in an optional size without the need of transferring the data to the frame memory or the like.

According to the invention of the aspect 5, expansion and contraction at a certain magnification can be performed with a simple processing, by repeating the stop/motion of the readout address count from the first buffer memory in a predetermined order, hence the processing can be performed at a high speed.

According to the invention of the aspect 6, since the display control section can perform the data conversion based on the data format information in the stored information, the format to store the data for the display is not limited. Hence there is no need to transfer the display character and the like stored in the data memory to the frame buffer, thus the processing can be performed at a high speed.

According to the invention of the aspect 7, since said display control section is provided with a program memory and a data memory for storing the necessary program and the data, it is not necessary to read out the data from the main memory every time of processing. Hence, the number to use the data bus can be reduced, thus the processing can be performed at a high speed.

According to the invention of the aspect 8, said display control section can flexibly correspond to the change of the screen mode or the graphic area so as to transfer the information necessary for said program memory and said data memory from the main memory. Since the program or the data exceeding the capacity can be read out from the main memory, the capacity of the memory may be small, thus a compact system can be built at a low cost.

According to the invention of the aspect 9, when the display data is transferred to each line memory, the line number which used the data is written simultaneously in the used line information memory corresponding to every one dot, and it is judged if the data on the line memory is effective or not by comparing it with the line number which is to be displayed at the time of display, thereby it is not required to clear the content of the line memory every time the line memory is used, hence the processing can be performed at a high speed. And the used line information in the line memory does not have to be deleted for every line display but has only to delete the used line information in all the line memory for every period of vertical retrace, hence the processing can be performed at a high speed.

The invention claimed is:

1. A programmable display device comprising:

a main memory which stores the display data;

a data processing circuit which converts the data format of said display data into the data format of the screen display;

a number of line memories which store the display data converted by said data processing circuit per unit of the display line;

a display control section which controls the transfer and storage of the display data from said main memory to said line memory and the readout of the necessary display data from said line memory to display it on the screen; and a main control section which controls the storage of said display data in said main memory, and the transfer of the stored information including the data format and the storage address to said display control section, wherein said display control section reading out said display data by specifying the address of the display data for one line which has a possibility to be displayed on the screen to said main memory from which the display data is transferred, based on said stored information, causing said data processing circuit to perform the data transfer and select said line memory to store said display data.

2. A programmable display device according to claim 1, wherein said display control section controls the storage of the display data to be utilized repeatedly in said line memory, so that when the repeated display data is displayed, said repeated display data is read out from said line memory by specifying the address thereof and displayed on the screen.

3. A programmable display device according to claim 1, further comprising a data buffer memory for storing the display data to be utilized repeatedly, and when said data is displayed on the screen, said display control section causes said repeated display data to be read out from said data buffer memory and displayed on the screen.

4. A programmable display device according to claim 1, which includes:

a first buffer memory for storing the display data read out from said main memory;

a second buffer memory for storing the display data read out from said first buffer memory; and an address counter for counting the readout address and the write address of said first and the second buffer memories; wherein said display control section controlling the stop and motion of the readout address count and the write address count, respectively, with respect to said address counter, performing the processing of expansion, contraction and skip and storing the data in said line memory.

5. A programmable display device according to claim 4, wherein said display control section causes the stop and motion of the readout address count to be repeated in a predetermined order.

6. A programmable display device according to claim 1, wherein said data processing circuit has a plurality of conversion processing circuits for converting various data formats, and said display control section selects said conversion processing circuits based on the data format information of said stored information.

7. A programmable display device according to claim 1, wherein said display control section is provided with a program memory and a data memory for storing the necessary programs and data.

8. A programmable display device according to claim 7, wherein said display control section causes the information necessary for said program memory and said data memory to be transferred from said main memory.

9. A programmable display device according to claim 1, wherein said display control section adds the line information showing in which line the data is to be used when storing the display data in said line memory, and controls the display of the data in such a manner that when reading out the display data from said line memory, the line information is read out simultaneously and the data is displayed only when the line which uses said display data is the same with the line information.

* * * * *